(12) United States Patent
Carrubba et al.

(10) Patent No.: US 7,260,943 B2
(45) Date of Patent: Aug. 28, 2007

(54) APPARATUS AND METHOD FOR SERVICING A COOLANT SYSTEM

(75) Inventors: Vincent Carrubba, Tarrytown, NY (US); Ken Motush, Tarrytown, NY (US)

(73) Assignee: Interdynamics, Inc., Tarrytown, NY (US)

( * ) Notice: Subject to any disclaimer, the term of this patent is extended or adjusted under 35 U.S.C. 154(b) by 163 days.

(21) Appl. No.: 10/975,816

(22) Filed: Oct. 29, 2004

(65) Prior Publication Data

US 2005/0217285 A1     Oct. 6, 2005

Related U.S. Application Data

(60) Provisional application No. 60/516,552, filed on Oct. 31, 2003.

(51) Int. Cl.
F25B 45/00 (2006.01)
F25B 17/00 (2006.01)
F16K 37/00 (2006.01)

(52) U.S. Cl. .............................. 62/77; 62/146; 137/229

(58) Field of Classification Search .................... 62/77, 62/146, 149, 292, 299, 408, 410; 137/292, 137/315, 315.16, 315.39, 315.14, 229; 73/299
See application file for complete search history.

(56) References Cited

U.S. PATENT DOCUMENTS

| | | | | |
|---|---|---|---|---|
| 2,658,383 A | * | 11/1953 | Chipley | 374/16 |
| 3,214,860 A | * | 11/1965 | Johnson | 43/129 |
| 3,933,156 A | * | 1/1976 | Riggi | 606/25 |
| 4,110,998 A | * | 9/1978 | Owen | 62/125 |
| 4,535,802 A | * | 8/1985 | Robertson | 137/322 |
| 5,167,140 A | * | 12/1992 | Cooper et al. | 73/40.7 |
| 5,222,369 A | * | 6/1993 | Hancock et al. | 62/149 |
| 5,540,254 A | * | 7/1996 | McGowan et al. | 137/315.01 |
| 5,878,781 A | * | 3/1999 | Parker | 137/625.43 |
| 5,975,151 A | * | 11/1999 | Packo | 141/3 |
| 5,999,700 A | * | 12/1999 | Geers | 392/441 |
| 6,089,032 A | | 7/2000 | Trachtenberg | |
| 6,260,739 B1 | * | 7/2001 | Hsiao | 222/538 |
| 6,360,554 B1 | | 3/2002 | Trachtenberg | |
| 6,446,453 B1 | | 9/2002 | Trachtenberg | |
| 6,467,283 B1 | | 10/2002 | Trachtenberg | |
| 6,481,221 B2 | | 11/2002 | Ferris et al. | |
| D470,863 S | | 2/2003 | Williams | |
| 6,539,988 B1 | | 4/2003 | Cowan et al. | |
| D476,119 S | | 6/2003 | Boyer et al. | |
| 6,609,385 B1 | | 8/2003 | Ferris et al. | |
| 6,648,035 B1 | | 11/2003 | Cowan et al. | |
| 6,722,141 B2 | | 4/2004 | Ferris et al. | |
| 6,978,636 B2 | * | 12/2005 | Motush et al. | 62/292 |

FOREIGN PATENT DOCUMENTS

JP      63-180778 A   *   7/1988

* cited by examiner

Primary Examiner—Mohammad M. Ali
(74) Attorney, Agent, or Firm—Plumsea Law Group, LLC

(57) ABSTRACT

An apparatus, system and method for servicing a coolant system, such as, an automobile air conditioner are disclosed. In one embodiment, the apparatus may comprise a device for measuring a parameter of the coolant system; and means for selectively switching between providing: (i) communication between the coolant system and said measuring device, and (ii) communication between the coolant system and the coolant supply.

38 Claims, 16 Drawing Sheets

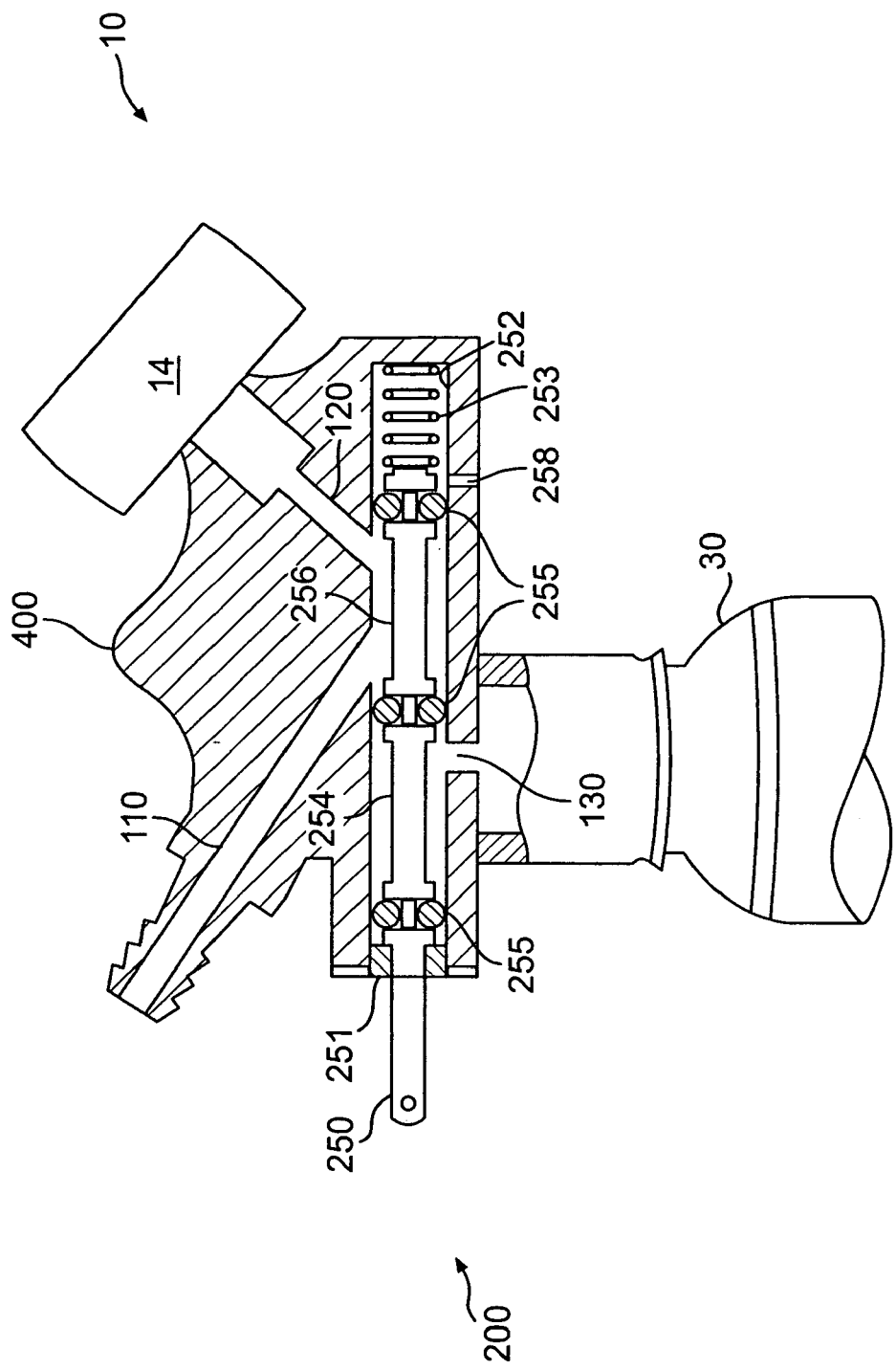

APPARATUS AND METHOD FOR SERVICING A COOLANT SYSTEM

CROSS-REFERENCE TO RELATED PATENT APPLICATIONS

This application claims priority on U.S. Provisional Patent Application Ser. No. 60/516,552, for Device for Measuring Pressure in Automobile Air Conditioner and Charging Same With Refrigerant, filed on Oct. 31, 2003, the entirety of which is incorporated herein by reference.

FIELD OF THE INVENTION

Embodiments of the present invention relate to an apparatus and method for servicing a coolant system.

BACKGROUND OF THE INVENTION

Many coolant systems, such as, automobile air conditioners, use chemicals called refrigerants to cool air. The refrigerants may be added to the coolant system as liquids, but utilized in the system as gases. These coolant systems operate based on the principle of Gay-Lussac's Law, which is:

$$P/T = P'/T' \text{ where } V \text{ is constant}$$

and where P=pressure, T=temperature, and V=volume. In accordance with this law, as the pressure of a compressed gas increases, its temperature increases. Conversely, as the pressure of the gas decreases, the temperature of the gas decreases. Expansion of a refrigerant gas in a coolant system acts to cool the system containing the refrigerant. Air blown over the cooled system, in turn may be cooled, and provided to a vent where it can cool an interior space, such as an automobile cabin. This is the basic concept of many refrigeration and air conditioning systems.

The ability to achieve cooling by compressing and expanding a gaseous refrigerant may depend to some degree on the level of liquid refrigerant present in the system. In an automobile air conditioning system, several factors may adversely affect the level of refrigerant in the system. For example, the system may be subject to significant swings in temperature and frequent thermal cycling due to the action of the air conditioner itself and the heat produced by the automobile's engine. Under these conditions, joints and fittings may tend to expand and contract, permitting refrigerant to slowly leak out of the system. In another example, the hoses used may be slightly permeable to the refrigerant, which may also permit the refrigerant to slowly leak out of the hoses. Accordingly, maintenance of an automobile air conditioning system may require monitoring the refrigerant level or pressure and periodic re-charging of the refrigerant as indicated.

Typical automotive air conditioners are provided with at least one service port to allow for the addition of refrigerant and checking on the level of refrigerant in the system. The check of refrigerant level and the addition of refrigerant may be attended to by a professional mechanic, however, there is no requirement that a professional carry out these functions. A growing number of automobile owners choose to perform this type of routine maintenance on their vehicles. This market is commonly referred to as the "do-it-yourself" market.

A standard tool used by professionals for servicing automobile air conditioners includes a set of manifold gauges. This device usually includes three hoses and two gauges: one hose connects to a low pressure service port; one hose connects to a high pressure service port; and the third hose connects to the source of refrigerant. The two gauges may be used to measure the pressure at the high and low pressure service ports.

Although manifold gauges are the standard tool used by professional auto mechanics for air conditioner service, several disadvantages may reduce their popularity among do-it-yourself consumers. Manifold gauges can be complicated to use. One must know the approximate ambient temperature and look up the pressure readings of the gauges on a chart to determine if there is sufficient refrigerant in the system. In addition, use of manifold gauges may be dangerous. Because these devices require handling of the high pressure service port of the automobile air conditioner, their use may present a risk of injury to inexperienced consumers. Furthermore, manifold gauges may be relatively expensive for a "do-it yourself" consumer considering the relative infrequency of their use for servicing of a single automobile. Accordingly, there is a need for new methods and apparatus for servicing air conditioners, such as those used in automobiles, which do not have the same drawbacks as manifold gauges.

Various method and apparatus embodiments of the present invention may be used to service air conditioners, such as those used in automobiles. Embodiments of the present invention may allow a consumer to measure the refrigerant pressure in an automobile air conditioner, and to add refrigerant as needed. Additional advantages of embodiments of the invention are set forth, in part, in the description which follows and, in part, will be apparent to one of ordinary skill in the art from the description and/or from the practice of the invention.

SUMMARY OF THE INVENTION

Responsive to the foregoing challenges, Applicant has developed an innovative apparatus for servicing a coolant system adapted to receive coolant from a coolant supply. The apparatus may comprise: a device for measuring a parameter of the coolant system; and means for selectively switching between providing: (i) communication between the coolant system and said measuring device, and (ii) communication between the coolant system and the coolant supply.

Applicant has further developed a device for servicing a coolant system, comprising: an outer housing; a central body disposed within the outer housing, the central body having an internal bore and first, second, and third fluid ports communicating with the internal bore; a valve disposed in the internal bore, the valve adapted to attain a first position in which there is communication between the first fluid port and the second fluid port, and a second position in which there is communication between the first fluid port and the third fluid port; and a valve actuator operatively connected to the valve.

Applicant has further developed an innovative system for servicing an automobile air conditioner. The system may comprise: a coolant supply source; means for measuring a parameter of the coolant in the automobile air conditioner; and a device for servicing the automobile air conditioner. The servicing device may comprise a central body; a valve disposed in the central body; and a valve actuator, wherein the valve is adapted to provide selective communication between the automobile air conditioner and (i) the measuring means, and (ii) the coolant supply source, responsive to an actuation force from the valve actuator.

Applicant has developed an innovative method for servicing a coolant system using a servicing apparatus attached to a measuring device and a coolant supply. The method may comprise the steps of: attaching the servicing apparatus to the coolant system; and selectively switching between providing: (i) communication between the coolant system and the measuring device, and (ii) communication between the coolant system and the coolant supply. The step of selectively switching may include the step of providing an actuating force to the servicing apparatus for switching between measuring a coolant system parameter and providing coolant to the coolant system.

Applicant has further developed an innovative method of servicing a coolant system using a servicing apparatus attached to a measuring device and a coolant supply, comprising the steps of: attaching the servicing apparatus to the coolant system; and selectively providing a squeezing force to the servicing apparatus for switching between measuring a coolant system parameter and providing coolant to the coolant system.

It is to be understood that both the foregoing general description and the following detailed description are exemplary and explanatory only, and are not restrictive of the invention as claimed.

BRIEF DESCRIPTION OF THE DRAWINGS

In order to assist the understanding of this invention, reference will now be made to the appended drawings, in which like reference characters refer to like elements.

FIG. 5 is a partial cross-sectional view of a coolant system servicing device in a measuring mode of operation according to a first alternative embodiment of the present invention.

DETAILED DESCRIPTION OF EMBODIMENTS OF THE INVENTION

Figure 1:
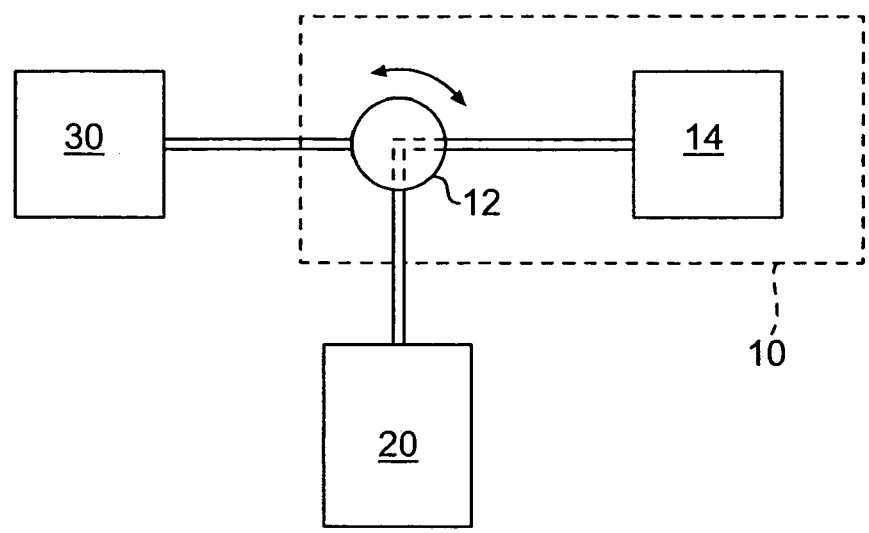
FIG. 1 is a block diagram of a system for servicing a coolant system according to an embodiment of the present invention.

Reference will now be made in detail to embodiments of the present invention, examples of which are illustrated in the accompanying drawings. In a first embodiment, with reference to FIG. 1, a device 10 for servicing a coolant system 20, and a coolant supply 30 are shown. The servicing device 10 may include a measurement device 14 and a switching device 12 for selectively providing communication between the coolant system 20, the coolant supply 30, and the measurement device 14. The servicing device 10 may be adapted to selectively switch between a charging mode of operation, in which coolant from the coolant supply 30 is provided to the coolant system 20, and a measuring mode of operation, in which a parameter of the coolant system 20 is measured by the measurement device 14. The depiction of the switching device 12 is intended to be illustrative only, and not limiting. Any means for providing the indicated switching may be used in alternative embodiments of the invention.

The servicing device 10 may be used to determine the level of coolant in the coolant system 20, and/or add coolant to the coolant system 20 from the coolant supply 30. In one method embodiment of the present invention, use of the servicing device 10 may be initiated by connecting the servicing device 10 to the coolant system 20 and the coolant supply 30. The switching device 12 may be oriented at this time to provide communication between the measurement device 14 and the coolant system 20. In this configuration, the measurement device 14 displays one or more parameters of the coolant system 20. In one embodiment, the measurement device 14 indicates a pressure level of the coolant system 20. The user may then read the pressure of the coolant system 20, for example, to determine whether or not additional coolant should be added to the system. If the addition of coolant is needed, the user may change the orientation of the switching device 12 so that it provides communication between the coolant system 20 and the coolant supply 30. When the switching device 12 is oriented so, coolant may be provided from the coolant supply 30 to the coolant system 20. In this orientation, communication between coolant system 20 and the measurement device 14 may be substantially prevented. The user may change the orientation of the switching device 12 as desired to alternate between providing coolant to the coolant system and checking the pressure of the coolant system.

Figure 2:
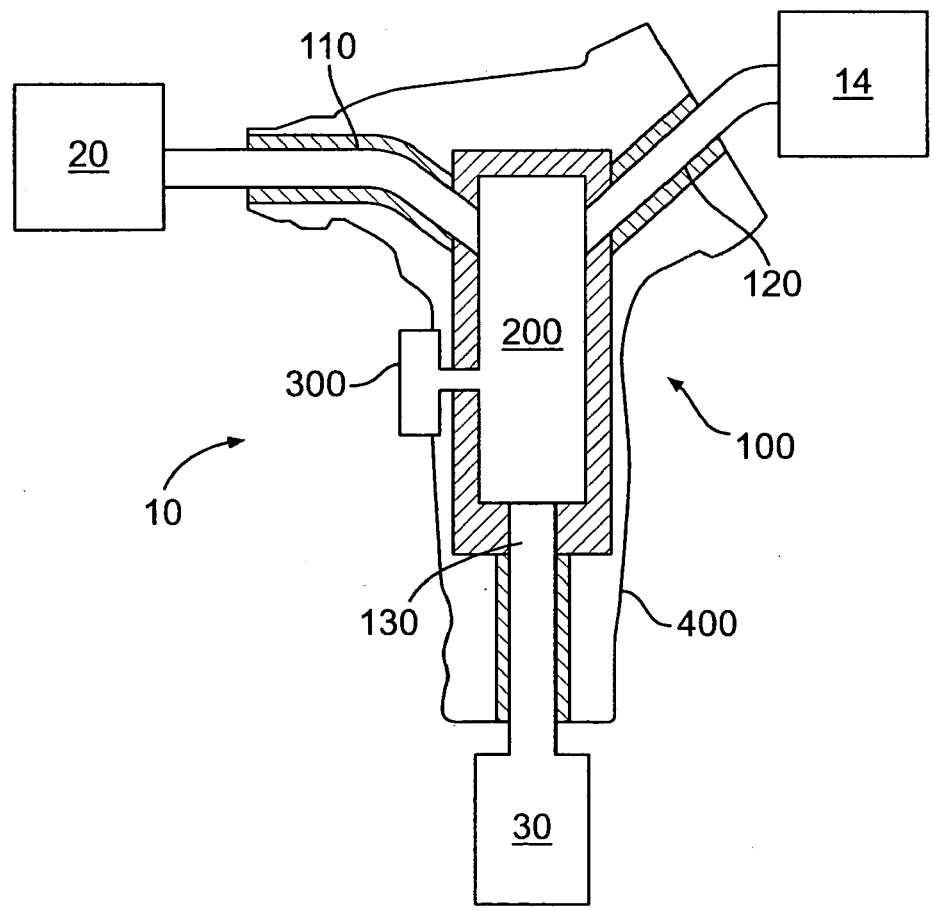
FIG. 2 is a schematic diagram of a coolant system servicing device according to an embodiment of the present invention.
Figure 3A:
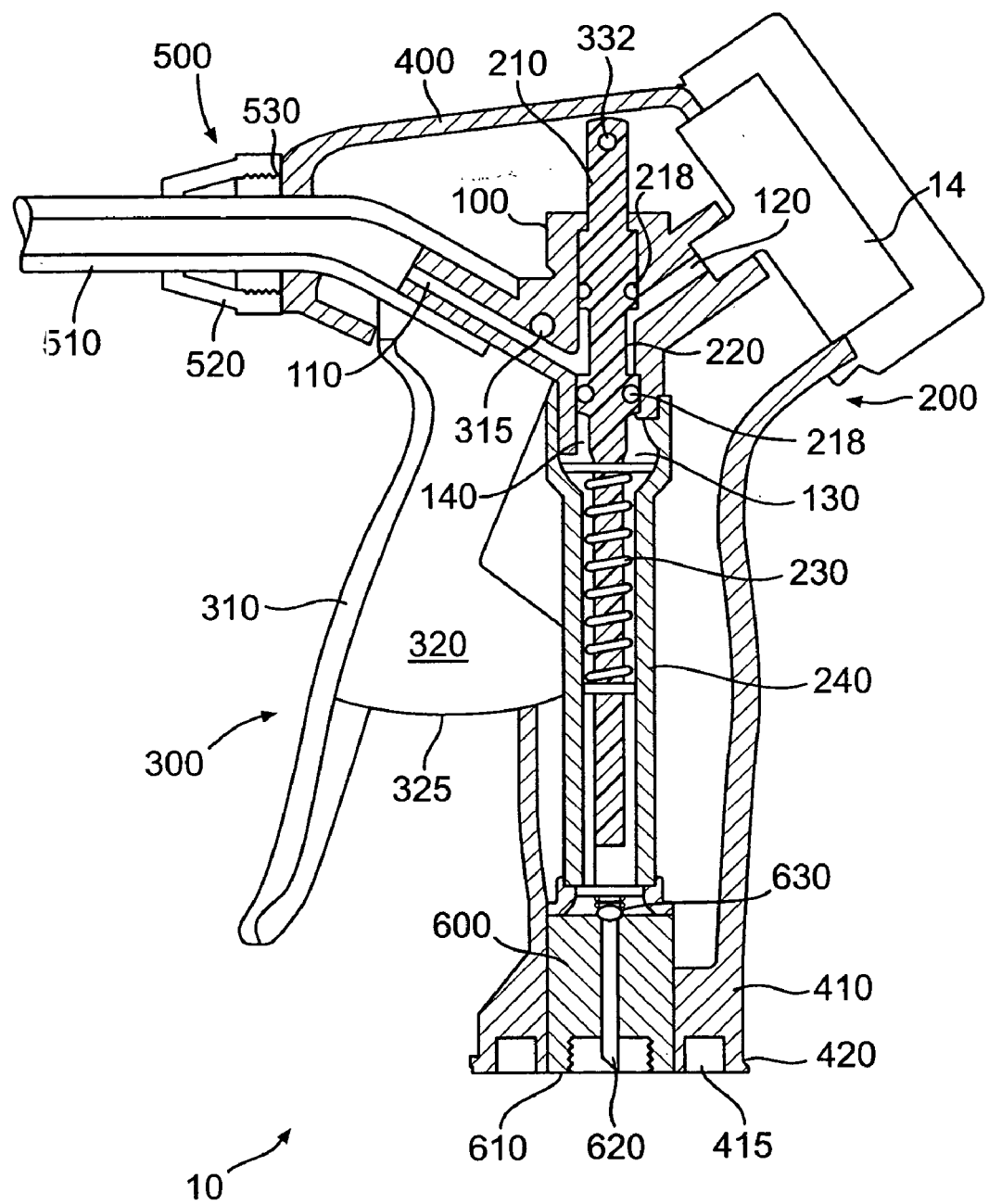
FIG. 3A is a sectional view of a coolant system servicing device in a measuring mode of operation according to an embodiment of the present invention.

In one embodiment of the present invention, shown in FIG. 2, the servicing device 10 may include a central body 100, a valve 200, a valve actuator 300, and a housing 400. The central body 100 may include or communicate with a first fluid port 110, a second fluid port 120, and a third fluid port 130. The valve 200 may be adapted to provide selective communication between (i) the first fluid port 110 and the second fluid port 120, and (ii) the first fluid port 110 and the third fluid port 130, in response to an actuation of the valve actuator 300. The valve 200 shown in FIG. 2 may carry out the function of the switching device 12 shown in FIG. 1. The first port 110 may be adapted to connect to the coolant system 20, the second port 120 may be connected to the measurement device 14, and the third port 130 may be adapted to connect to the coolant supply 30. In one embodiment, the measurement device 14 may be incorporated into the housing 400 (as shown in FIG. 3A, for example). With continued reference to FIG. 2, the servicing device 10 may be used to determine the level of coolant in the coolant system 20, and/or add coolant to the coolant system from the coolant supply 30 in the same manner as explained above in connection with the embodiment of the invention shown in FIG. 1.

In the embodiments of the present invention shown in FIGS. 1 and 2, the measurement device 14 is described as preferably being a pressure gauge used to measure the pressure of the coolant in the coolant system 20. It is contemplated that the measurement device 14 may be adapted to measure other suitable parameters of the coolant system 20.

Figure 4A:
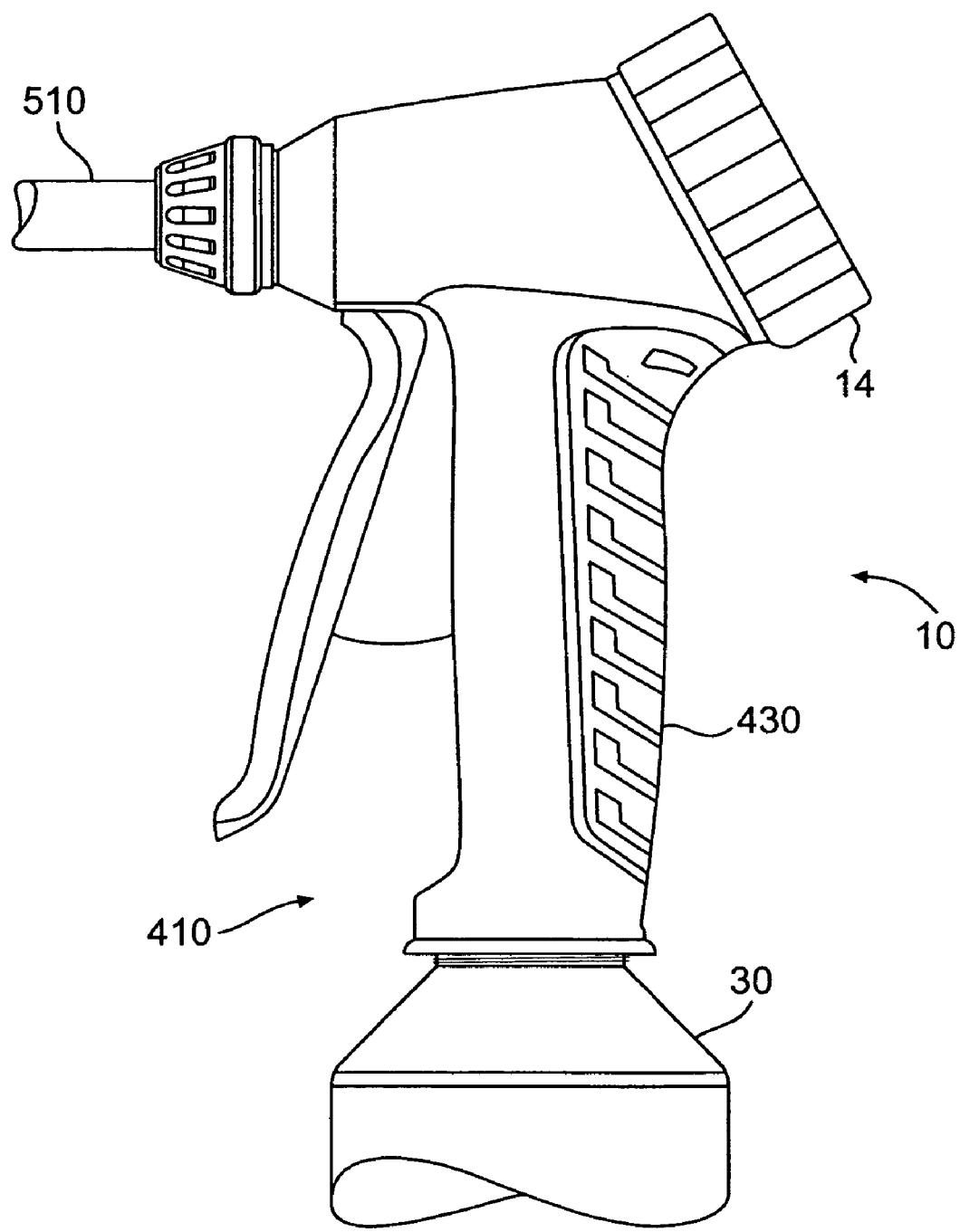
FIGS. 4A and 4B are side pictorial views of a coolant system servicing device attached to a pressurized container of coolant according to various embodiments of the present invention.
Figure 4B:
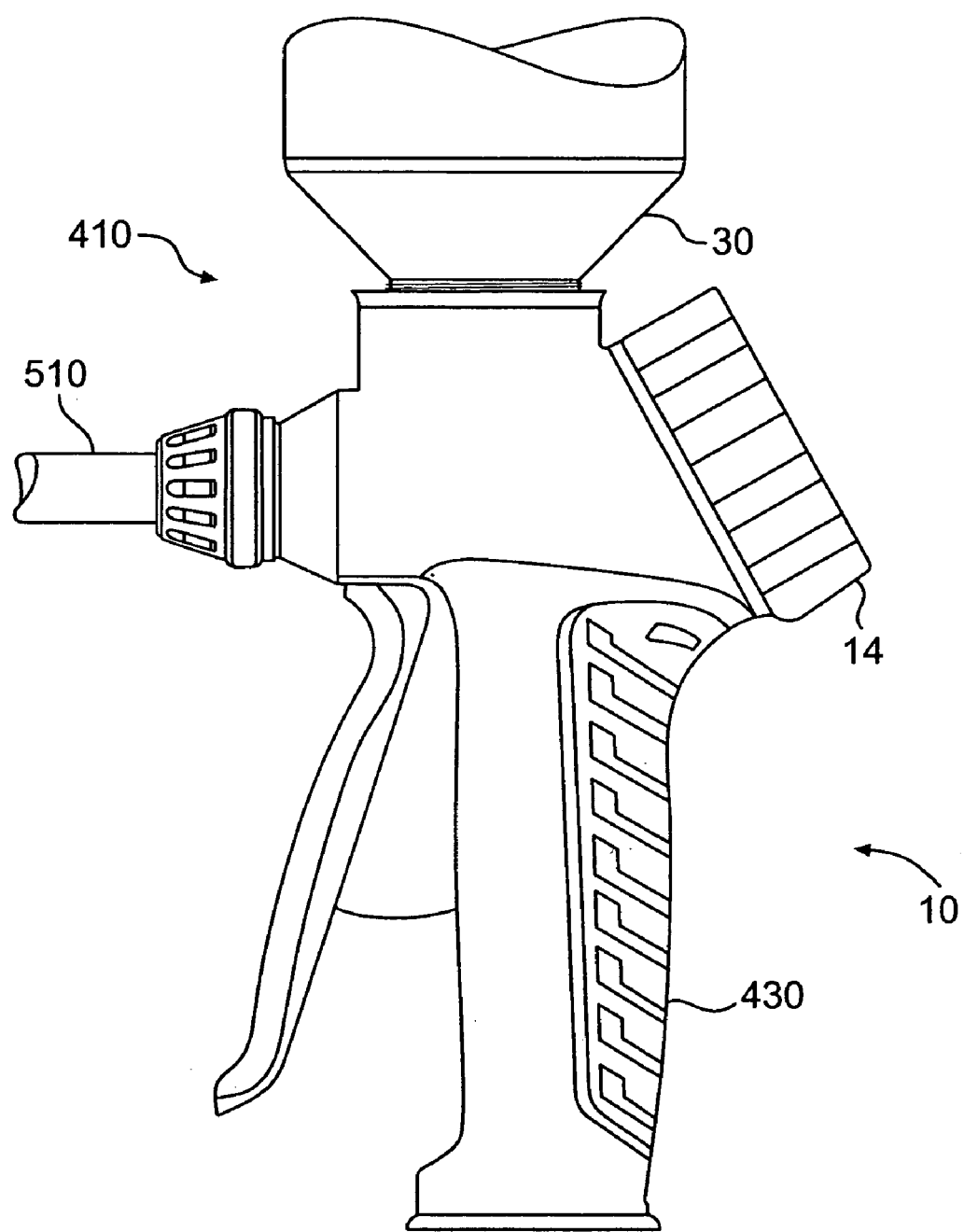

In various embodiments of the present invention, the coolant supply 30 may comprise a pressurized container including at least a refrigerant, as shown in FIGS. 4A and 4B. The container may comprise an Acme threaded container or other suitable container type. The refrigerant may comprise R134a, R12 (i.e., Freon), and/or other suitable coolant system refrigerant. In alternative embodiments of the invention, the coolant supply 30 may further include other suitable chemicals, such as, for example, leak detector and/or system lubricant.

The orientation of the coolant system 20, the coolant supply 30, and the measurement device 14 relative to the servicing device 10, shown in FIG. 2, is intended to be illustrative only, and not limiting. For example, with reference to FIGS. 4A and 4B, it is contemplated that the receiving end 410 of the housing 400 for the coolant supply 30 may be located at either the top or the bottom of the servicing device 10. Other orientations of the coolant system 20, the coolant supply source 30, and the measurement device 14 relative to the servicing device 10 are also considered possible and are within the scope of the present invention.

Another embodiment of the present invention will now be described with reference to FIGS. 3A, 3B, and 3C, in which like reference numerals refer to like elements in other embodiments, and which illustrate the same servicing device 10 in a measuring mode of operation (FIG. 3A), and a charging mode of operation (FIG. 3B), respectively. With respect to FIGS. 3A and 3B, the servicing device 10 may include a central body 100, a valve 200, a valve actuator 300, and a housing 400. The central body 100 may include or communicate with a first fluid port 110, a second fluid port 120, and a third fluid port 130. The valve 200 may be adapted to provide selective communication between (i) the first port 110 and the second port 120, and (ii) the first port 110 and the third port 130, in response to an actuation of the valve actuator 300. The first port 110 may be adapted to connect to a coolant system (not shown), the second port 120 may be connected to a measurement device 14, and the third port 130 may be adapted to connect to a coolant supply (not shown).

The valve 200 may include a plunger 210 slidably disposed in a valve bore 140 formed in the central body 100. The valve bore 140 may be in selective fluid communication with the first port 110, the second port 120, and the third port 130 depending upon the position of the plunger 210. The plunger 210 may include an annular recess 220 provided between first and second grooves. Each of the grooves may be adapted to receive a sealing ring 218. The plunger 210 may be biased within the bore 140 in an upward direction by a spring 230. A tube 240 may extend from the third port 130 of the central body 100.

The servicing device 10 may further comprise a receiving end 410 adapted to secure the device to a pressurized container of the coolant supply (not shown). The receiving end 410 of the housing 400 may include a recess 415 provided in an outer flange 420. The recess 415 and the outer flange 420 may be adapted to receive the hub of the coolant supply container (not shown) and support the servicing device 10 on the container. A pictorial view of the servicing device 10 of FIGS. 3A-C while mounted on a coolant supply container 30 is shown in FIG. 4A. In an alternative embodiment shown in FIG. 4B, the coolant supply container 30 may be mounted on the servicing device 10 in a location closer to the measurement device 14.

An adapter 600 for connecting the servicing device 10 to the coolant supply may be disposed in the housing 400 at receiving end 410. The adapter 600 may include a threaded bore 610 for engaging a threaded nozzle of the coolant supply. A piercing member 620 may be disposed in the adapter 600. The piercing member 620 may include a sharp distal end such that when the adapter 600 engages the coolant supply container, the piercing member 620 pierces the seal of the container. The piercing member 620 is preferably hollow so as to allow the contents of the coolant supply container to exit from the container into the service device 10. In one embodiment, the piercing member 620 comprises a fixed needle.

A check valve 630 may be disposed near or in a lower portion of the tube 240 proximate to the adapter 600. The check valve 630 may be adapted to permit primarily one-way fluid communication between the coolant supply container and the servicing device 10. In this manner, the check valve 630 may prevent undesired flow of coolant from the coolant system and the servicing device 10 back into the coolant supply container 30.

The servicing device 10 may further comprise a valve actuator 300 for selectively applying an actuating force to the valve 200. In one embodiment, the valve actuator 300 may be adapted to receive a squeezing or gripping force.

Figure 3B:
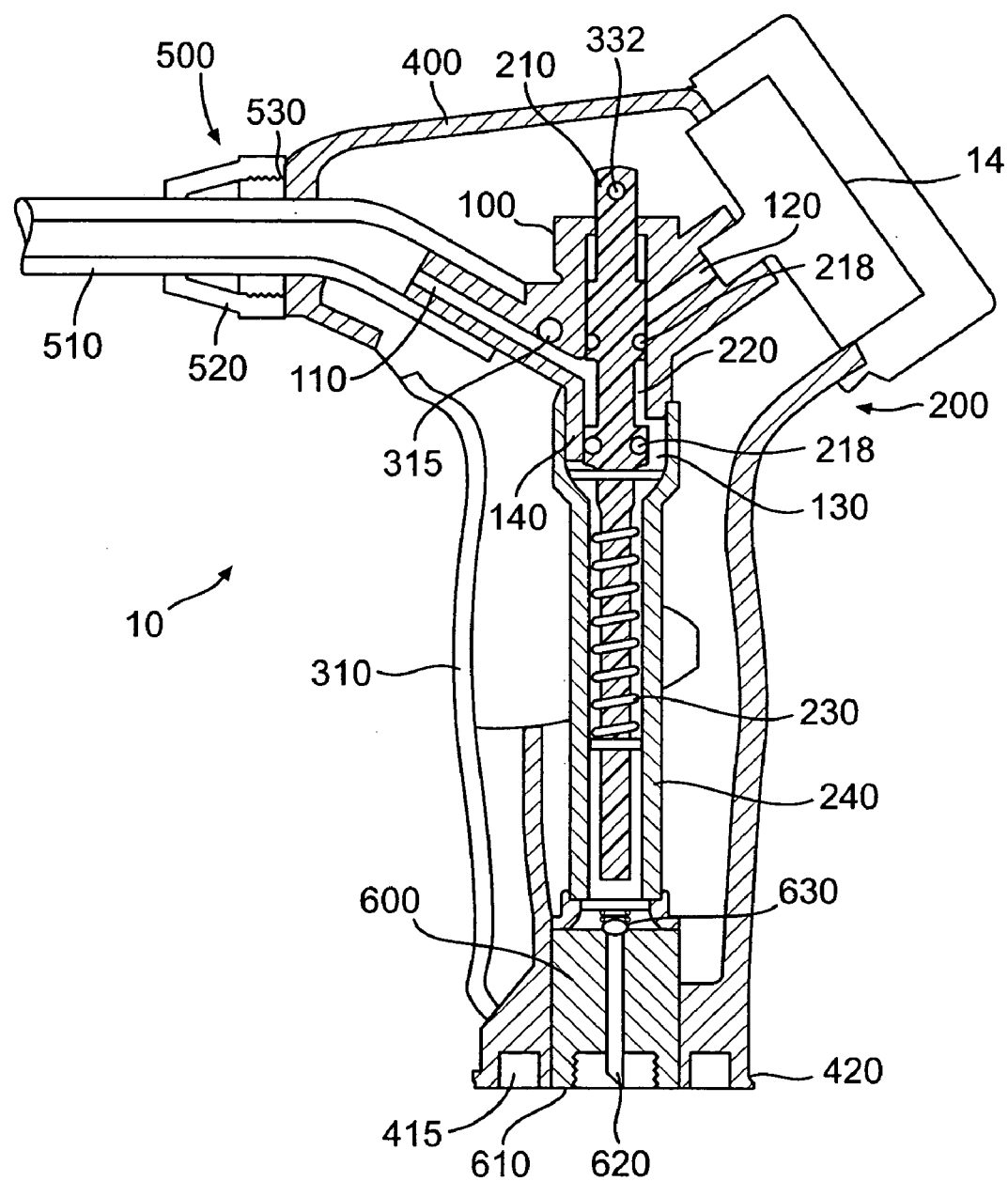
FIG. 3B is a sectional view of a coolant system servicing device in a charging mode of operation according to an embodiment of the present invention.
Figure 3C:
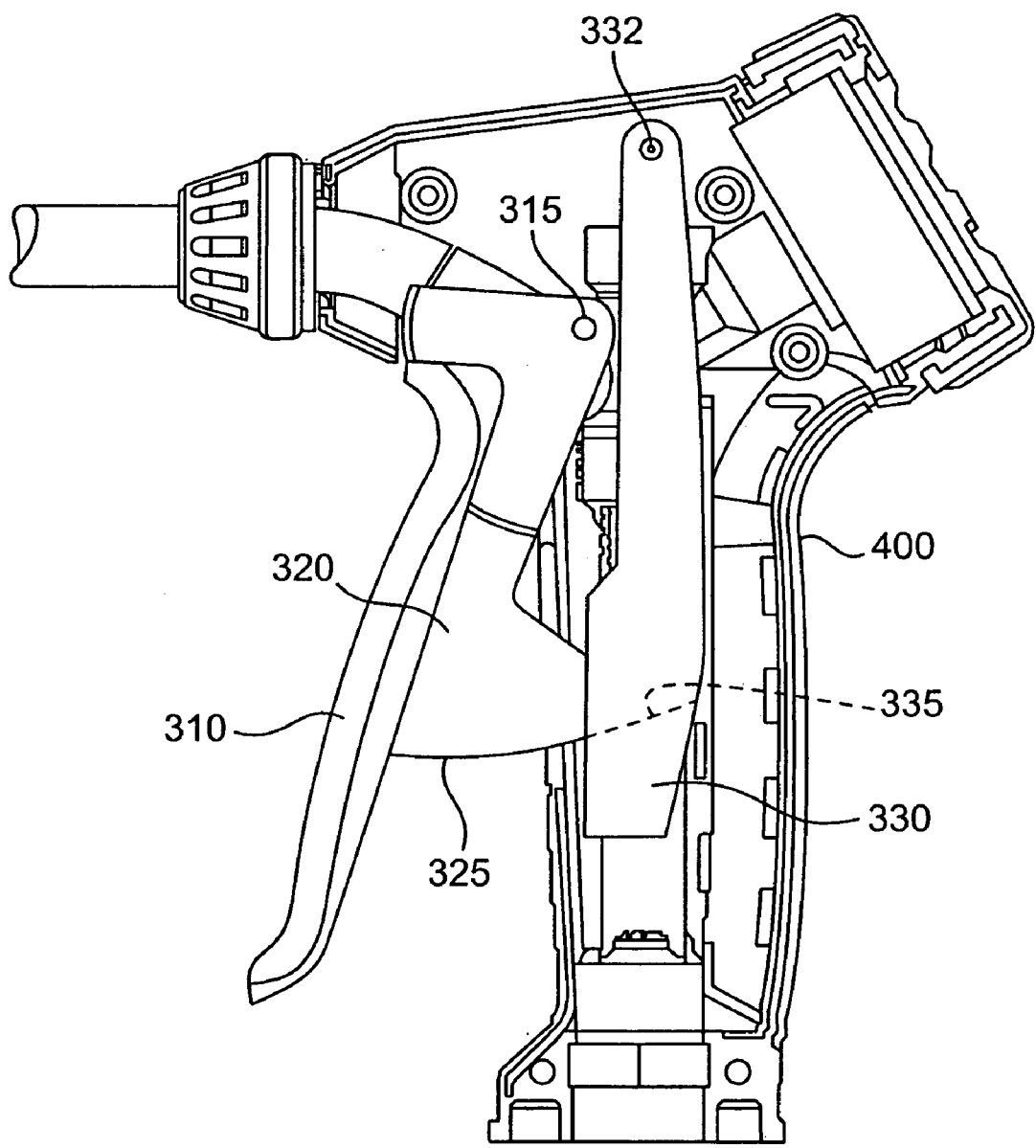
FIG. 3C is a side cross-sectional view of a coolant system servicing device in a measuring mode of operation according to an embodiment of the present invention.

With reference to FIGS. 3A, 3B, and 3C, the valve actuator 300 may include a handle 310 pivotally attached to the central body 100 by a pin 315. The handle 310 may include a blade portion 320 having a cam edge 325. Detail of the manner in which the blade portion 320 and the cam edge 325 may be used to actuate the valve 200 may be explained in connection with FIG. 3C. With reference to FIG. 3C in particular, the valve actuator 300 may include single or dual arms 330 which may be attached to the plunger 210 (see FIG. 3A) by a pin 332. The arm(s) 330 may extend between the top of the plunger 210 and the cam edge 325. The arm(s) 330 may include a cam engaging surface 335 designed to smoothly and gradually receive the cam edge 325 of the blade 320. When the handle 310 is squeezed (moved towards the housing 400 in the embodiment shown in FIG. 3C), the cam edge 325 may force the arm(s) 320 downward, overcoming the upward bias of the valve spring 230, and moving the plunger 210 from a first measuring position in the bore 140 (shown in FIG. 3A) to a second charging position (shown in FIG. 3B). Release of the handle 310 may allow the plunger 210 to return to its measuring position under the influence of the spring 230. In some embodiments of the present invention, the valve actuator 300 may be adapted for one-handed operation. In some embodiments, the valve actuator 300 may be adapted such that switching the servicing device 10 between a measuring mode of operation and a charging mode of operation may occur without a user having to let go of the device.

It is contemplated that other suitable means for providing an actuating force to the valve 200 are considered to be within the scope of the present invention. For example, means other than the arm(s) 330 for actuating the plunger 210 with the handle 310 are considered within the scope of the present invention, including, but not limited to, hydraulic, mechanical, or pneumatic members that could be used to link the plunger 210 with the handle 310. In addition, the valve actuator 300 may be adapted to receive other actuation forces, such as, for example, pulling, rotating, and/or pushing forces.

The servicing device 10 may further comprise means for connecting the device to a coolant system (not shown). With renewed reference to FIGS. 3A and 3B, the device 10 may include a hose assembly 500. The hose assembly 500 may include a hose 510 having a first end attached to the central body 100 in communication with the first port 110. The hose 510 may be secured to the housing 400 with a nut 520. In one embodiment, the nut 520 may engage a corresponding connector 530 associated with the housing 400. A second end of the hose (not shown) may be provided with a coupler adapted to connect to the coolant system 20. In one embodiment of the present invention, the coupler may comprise a quick-connect coupler adapted to connect to a low pressure service port of an automobile air conditioner.

Operation of an embodiment of the invention shown in FIGS. 3A-C will now be described. The servicing device 10 may be connected to a coolant supply at the receiving end 410 and to an automobile coolant system by the hose 510. At this time the handle 310 may remain in its extended position, as shown in FIG. 3A. Connection of the servicing device 10 to the coolant supply causes the piercing member 620 to pierce a seal on the top of the coolant supply. As a result, pressurized coolant may pass through the piercing member 620, the check valve 630, and the tube 240. While the servicing device 10 is in the position shown in FIG. 3A, the refrigerant may not be able to flow past the plunger 210 in the central body 100, and as a result the flow of refrigerant does not extend past the third port 130.

While the servicing device 10 is in the position shown in FIG. 3A, the device may be used to measure the pressure of the refrigerant in the coolant system. While in this position, the plunger 210 is biased into its upper position by the spring 230. The annular recess 220 of the plunger 210 may provide communication between the first port 110 (which is connected to the coolant system) and the second port 120 (which is connected to the measurement device 14). The sealing rings 218 may substantially prevent communication between the third port 130 and either of the first or second ports 110 and 120. As a result, the second port 120 experiences pressure similar to the pressure of the first port 110, which, in turn, is similar to the internal pressure of the coolant system. In this manner, the measurement device 14 may measure the coolant system pressure (or other parameter in alternative embodiments).

The user may inspect the measurement device 14 and determine if additional coolant is required. In some embodiments, the measurement device 14 may indicate the need for additional coolant, for example, by displaying a measurement reading. If a need for additional coolant is determined, the user may use the servicing device 10 to charge the coolant system with more coolant from the coolant supply. When charging operation is desired, an actuation force may be applied to the valve 200 using the handle 310. As shown in FIGS. 3B and 3C, when the handle 310 is squeezed, the cam edge 325 may push down on the cam surface 335, causing the arm(s) 330 to move downward. The downward motion of the arm(s) 330 may in turn cause the plunger 210 to move downward within the bore 140. In this position, the sealing rings 218 may substantially prevent communication between the second port 120 and either of the first or third ports 110 and 130. At the same time, the sealing rings 218 allow communication between the first and third ports 110 and 130. As a result, coolant from the coolant supply may flow through the piercing member 620, the tube 240, and past first port 110 to the coolant system. The user may apply an actuation force to the valve 200 by squeezing the handle 310 as desired to alternate between providing coolant to the coolant system and measuring a parameter of the coolant system.

It is appreciated that the servicing device 10 may be adapted to selectively switch between the charging mode of operation and the measuring mode of operation in alternative ways. For example, it is contemplated that the device 10 may be adapted such that an actuation force is applied for measuring operation, and no actuation force is applied to the valve 200 for charging operation.

Figure 6:
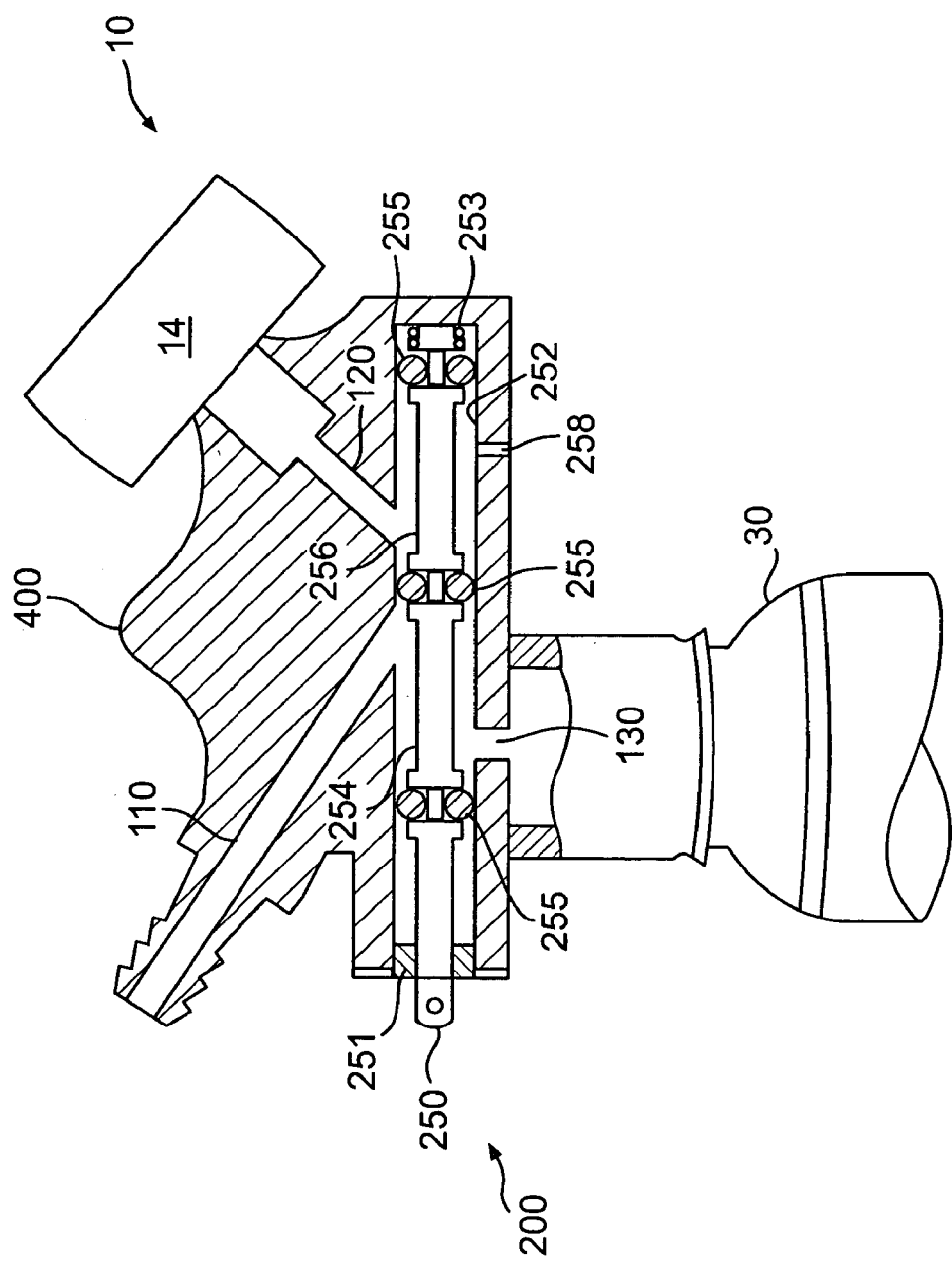
FIG. 6 is a partial cross-sectional view of the coolant system servicing device shown in FIG. 5 in a charging mode of operation.

Another embodiment of the present invention will now be described with reference to FIGS. 5 and 6, in which like reference numerals refer to like elements in other embodiments, and which illustrate the same servicing device 10 in a measuring mode of operation (FIG. 5), and a charging mode of operation (FIG. 6). With respect to FIGS. 5 and 6, the servicing device 10 may include a valve 200 comprising a plunger 250 slidably disposed in a bore 252 disposed in a housing 400. The plunger 250 may include a first annular recess 254 and a second annular recess 256 provided between sealing rings 255. The plunger 250 may be biased against a stop 251 by a spring 253 disposed in the bore 252.

In one embodiment, as shown in FIGS. 5 and 6, the bore 252 may have a substantially horizontal orientation within the housing 400. The horizontal orientation of the bore 252 may permit a substantially compact arrangement of the first port 110, the second port 120, the measurement device 14, and the plunger 250. In this manner, the servicing device 10 may have a small height profile. The small height profile may lead to advantages in some embodiments such as, for example, easier packaging and/or shipping of the device 10.

The servicing device 10 may further include a venting orifice 258 formed in the housing 400. The orifice 258 is in communication with the bore 252 and may be in selective communication with the second port 120 depending on the position of the plunger 250. In some cases, pressure may build up in the second port 120 during operation of the device 10. When the device 10 is in a charging mode of operation, this built up pressure may cause the measurement device 14 to display a reading even though the measurement device 14 is not in communication with the coolant system. The orifice 258 is adapted to vent pressure from the second port 120 to ambient when the orifice 258 is in communication with the second port 120. As a result, the measurement device 14 may indicate a measurement reading of substantially zero such that the user does not receive an inaccurate measurement reading during charging operation.

The plunger 250 may be adapted to provide selective communication between (i) the first port 110 and the second port 120, and (ii) the first port 110 and the third port 130, in response to an actuation of the plunger 250. The actuation of the plunger 250 may be provided by a mechanical link, or other suitable means. As discussed above, the first port 110 may be adapted to connect to a coolant system (not shown), the second port 120 may be connected to a measurement device 14, and the third port 130 may be adapted to connect to a coolant supply container 30.

Operation of the embodiment of the present invention shown in FIGS. 5 and 6 will now be described with reference to FIGS. 5 and 6. While the plunger 250 is in the position shown in FIG. 5, the device 10 may be used to measure the pressure of the refrigerant in the coolant system. While in this position, the plunger 250 is biased against the stop 251 by the spring 253. The annular recess 254 of the plunger 250 may provide communication between the first port 110 (which is connected to the coolant system) and the second port 120 (which is connected to the measurement device 14). The sealing rings 255 may substantially prevent communication between the third port 130 and either of the first or second ports 110 and 120. As a result, the second port 120 experiences pressure similar to the pressure of the first port 110, which, in turn, is similar to the internal pressure of the coolant system. In this manner, the measurement device 14 may measure the coolant system pressure (or other parameter in alternative embodiments).

The user may inspect the measurement device 14 and determine if additional coolant is required. In some embodiments, the measurement device 14 may indicate the need for additional coolant, for example, by displaying a measurement reading. If a need for additional coolant is determined, the user may use the servicing device 10 to charge the coolant system with more coolant from the coolant supply container 30.

When charging operation is desired, an actuation force may be applied to the plunger 250. When the actuation force is applied, the plunger 250 moves within the bore 252 against the bias of the spring 253 (in a rightward direction as shown in the embodiment depicted in FIGS. 5 and 6). In this position, as shown in FIG. 6, the sealing rings 255 allow communication between the first and third ports 110 and 130. As a result, coolant from the coolant supply container 30 may flow around the annular recess 254, and past first port 110 to the coolant system. At the same time, the sealing rings 255 may substantially prevent communication between the second port 120 and either of the first or third ports 110 and 130. The second port 120 may, however, communicate with the orifice 258, and pressure in the second port 120 may be vented to ambient through the orifice 258. As a result, the measurement device 14 may indicate a measurement reading of substantially zero such that the user does not receive an inaccurate measurement reading during charging operation. The user may apply an actuation force to the plunger 250 as desired to alternate between providing coolant to the coolant system and measuring a parameter of the coolant system. In other respects, the servicing device 10 shown in FIGS. 5 and 6 may operate substantially the same as the device shown in FIGS. 3A-C.

Figure 7A:
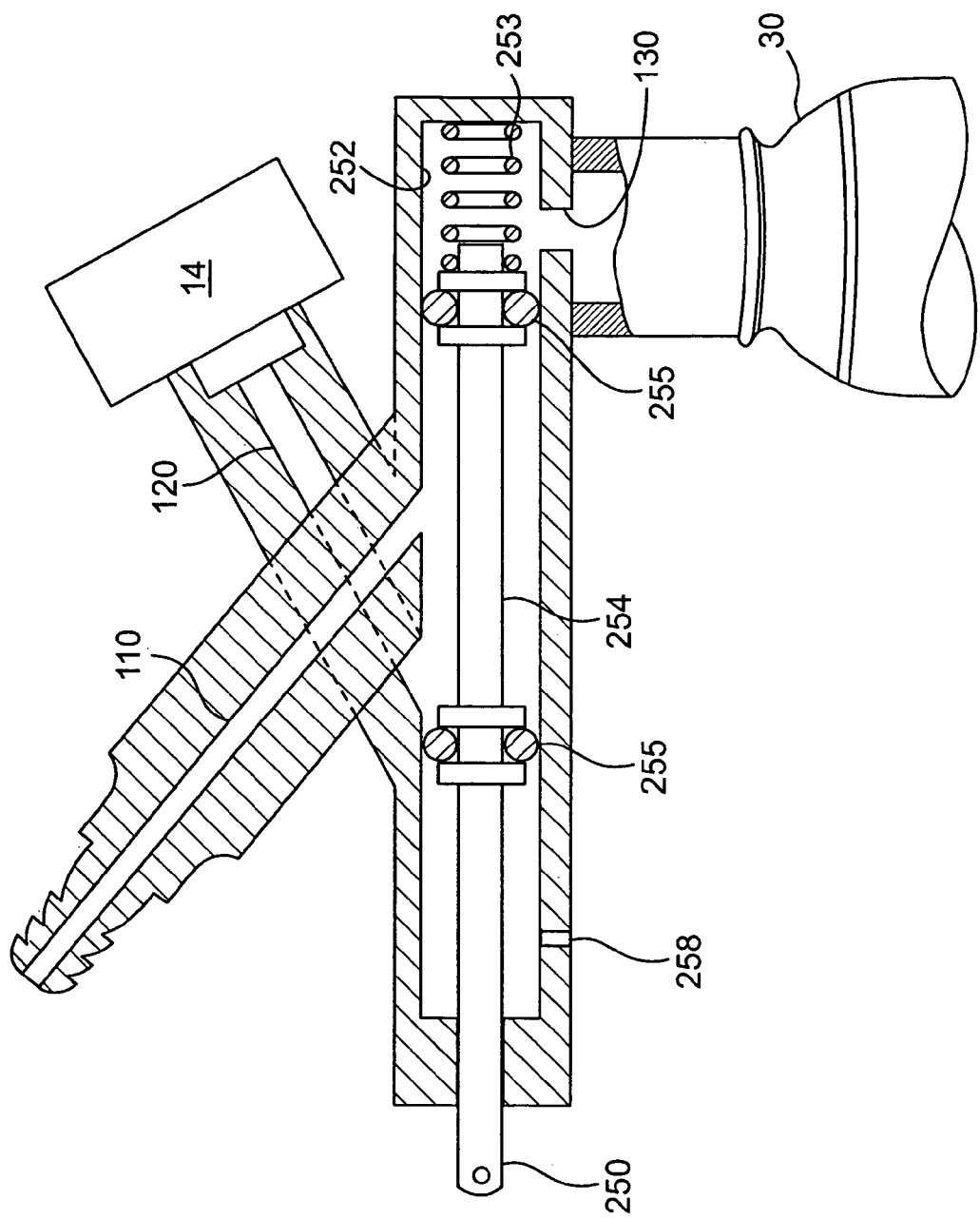
FIG. 7A is a partial cross-sectional view of a coolant system servicing device in a measuring mode of operation according to a second alternative embodiment of the present invention.
Figure 7B:
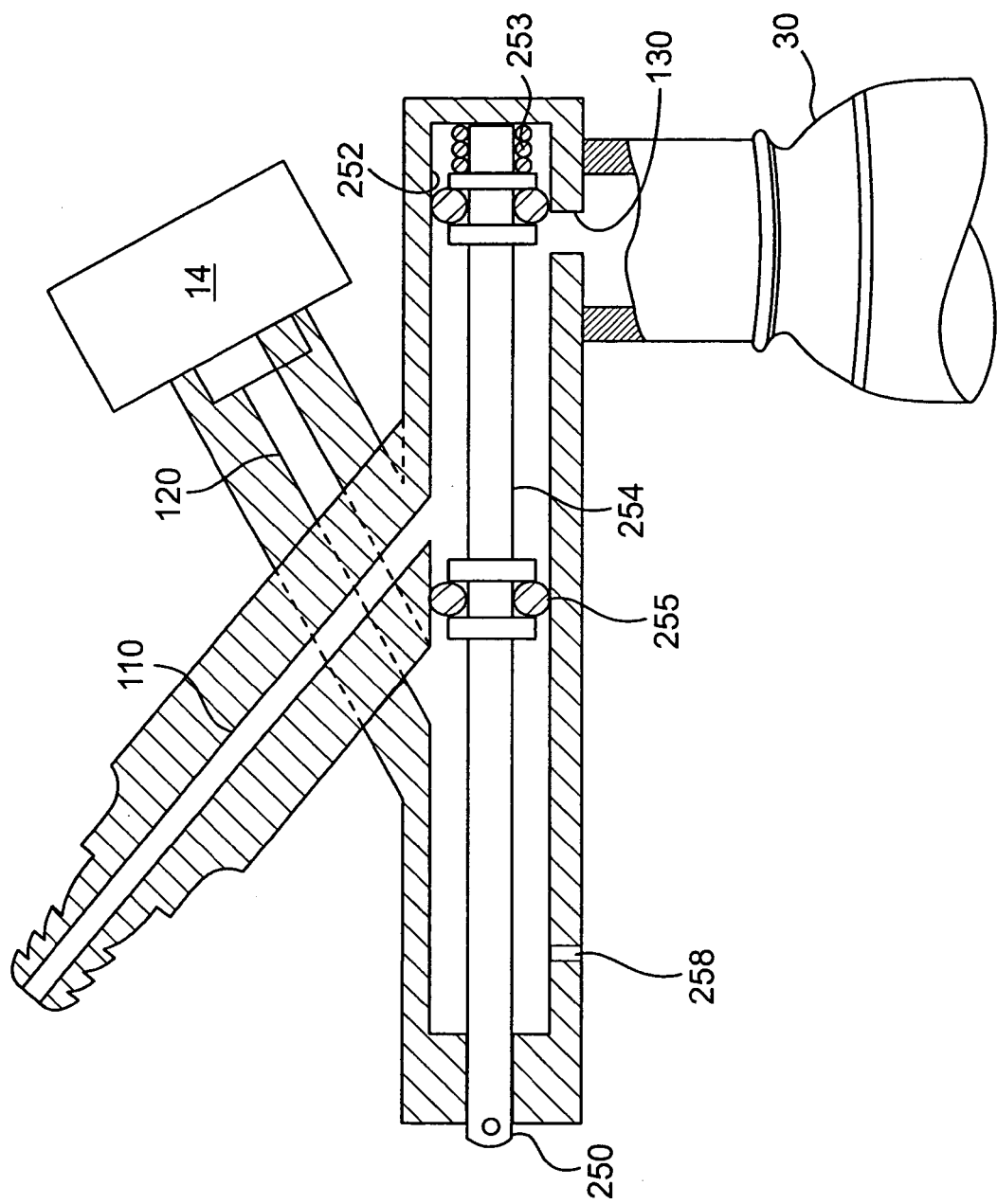
FIG. 7B is a partial cross-sectional view of the coolant system servicing device shown in FIG. 7a in a charging mode of operation.

Another embodiment of the present invention will now be described with reference to FIGS. 7A and 7B, in which like reference numerals refer to like elements in other embodiments, and which illustrate the same servicing device 10 in a measuring mode of operation (FIG. 7A), and a charging mode of operation (FIG. 7B). With respect to FIGS. 7A and 7B, the plunger 250 may include one annular recess 254 provided between sealing rings 255. The plunger 250 may be adapted to provide selective communication between (i) the first port 110 and the second port 120 (as shown in FIG. 7A), and (ii) the first port 110 and the third port 130 (as shown in FIG. 7B), in response to an actuation of the plunger 250. In this manner, the embodiment of the present invention shown in FIGS. 7A and B may operate substantially as described above in connection with the servicing device 10 shown in FIGS. 5 and 6.

Figure 8:
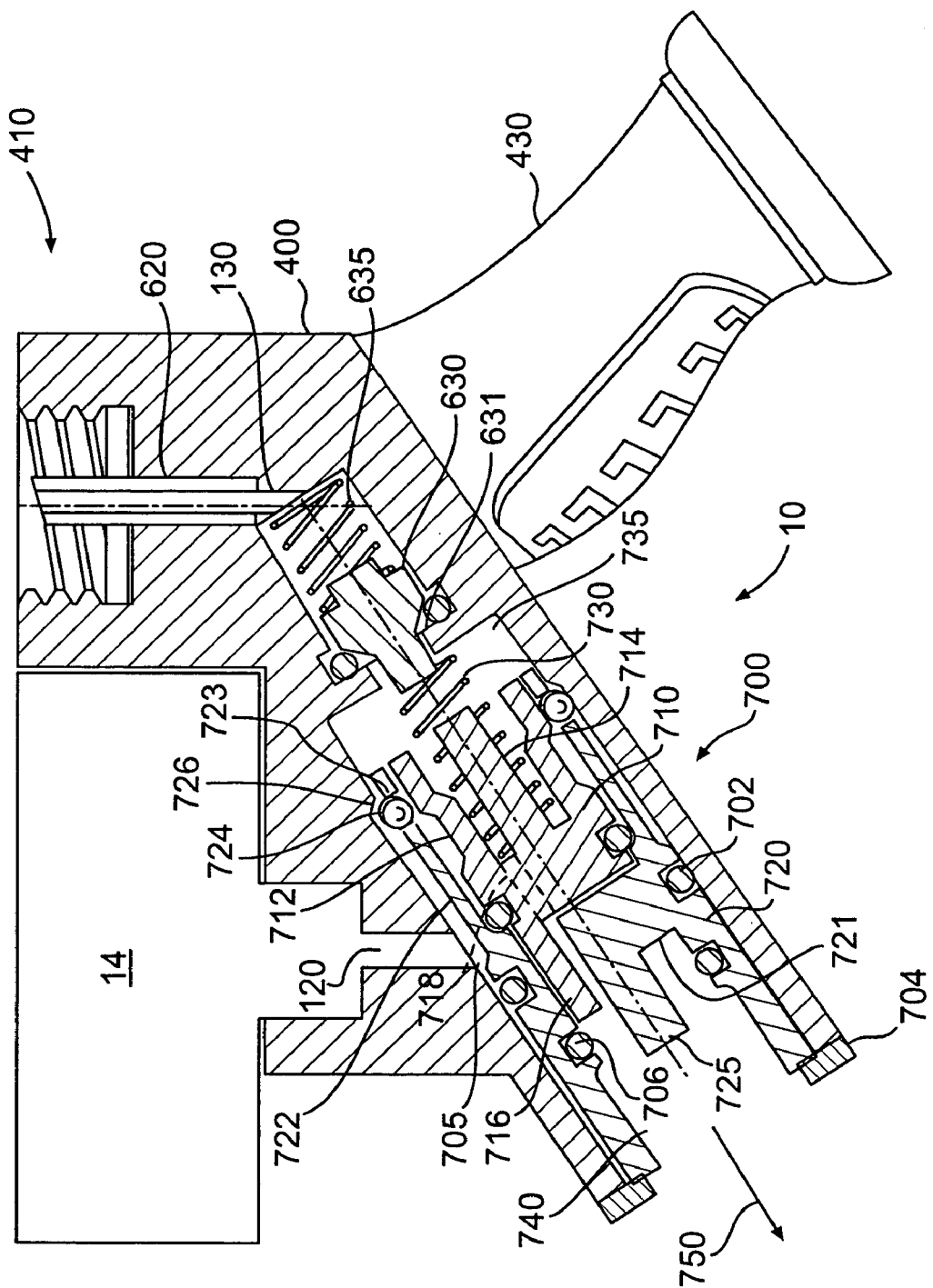
FIG. 8 is a partial cross-sectional view of a coolant system servicing device according to a third alternative embodiment of the present invention.

Another embodiment of the present invention is shown in FIG. 8, in which like reference numerals refer to like elements. A valve 700 having an inner piston 710 and an outer piston 720 may be slidably disposed in a bore 705 formed within the housing 400. An inner annular recess 712 may be formed in the inner piston 710 and an outer annular recess 722 may be formed in the outer piston 720. A first sealing ring 702 provides a seal between the outer piston 720 and the bore 705. A first spring 730 disposed in an inner cavity 735 may bias the valve 700 away from a check valve 630, which is biased against its seat 631 by a second spring 635. A stop 704 may prevent the valve 700 from falling out of the bore 705 when the device 10 is in the position shown in FIG. 8.

The device 10 may be adapted to connect to a component of a coolant system (not shown). For example, the device 10 may be adapted to connect to the low pressure service port of the coolant system. The low pressure service port may include a Schrader valve. As will be apparent to those of ordinary skill in the art, the Schrader valve may include a valve stem centrally disposed within a circumferential member. When the Schrader valve stem is actuated, the valve opens and permits substantially one-way communication into the coolant system through the low pressure service port.

An outer cavity 740 may be formed in the outer piston 720 and adapted to connect the device 10 to the coolant system. A first interior protrusion 714 may extend from the inner piston 710 toward the check valve 630, and a second interior protrusion 716 may extend from the inner piston 710 toward the cavity 740. An exterior protrusion 725 may extend from the outer piston 720 into the cavity 740. A detent 721 may be formed in the outer piston 720. The first interior protrusion 714 may be adapted to selectively contact and open the check valve 630. The exterior protrusion 725 may be adapted to selectively contact and open an element of the coolant system, such as, for example, the Schrader valve stem disposed in the low-pressure service port. The second interior protrusion 716 and the outer piston detent 721 may be adapted to contact the circumferential member of the low pressure service port. The second interior protrusion 716 may extend into the cavity 740 beyond the outer piston detent 721 such that during operation the circumferential member of the service port contacts the second interior protrusion 716 before contacting the detent 722. A second sealing ring 706 may be disposed in the cavity 740 and may sealingly engage the circumferential member of the service port during operation. A passage 718 formed in the inner piston 710 may provide communication between the outer cavity 740 and the inner cavity 735.

The device 10 may further include a locking mechanism comprising a plurality of ball bearings 724 disposed in corresponding holes 723 formed in the outer piston 720. The balls 724 are adapted to rest against a shoulder 726 formed in the housing 400 and, in this manner, selectively prevent the upward movement of the outer piston 720 within the bore 705. As the inner piston 710 moves axially upward within the piston bore 705 toward the check valve 630, the balls 724 are exposed to the inner annular recess 712. At this point, the balls 724 are adapted to slide off the shoulder 726 and into the inner recess 712. With the balls 724 in the inner recess 712, the balls 724 may clear the shoulder 726, and the outer piston 720 is able to move axially upward within the piston bore 705.

The valve 700 may be adapted to switch between a first position (shown, for example, in FIG. 8) in which the valve provides communication between the coolant system and the measuring device 14, and a second position in which the valve provides communication between the coolant system and the coolant supply. In this manner, the valve 700 may selectively switch between measuring a fluid parameter of the coolant system and charging the coolant system with coolant.

Operation of the embodiment of the present invention shown in FIG. 8 will now be described. Use of the servicing device 10 may be initiated by connecting the device to the low pressure service port of a coolant system. The device may be connected to the service port such that the exterior protrusion 725 contacts the Schrader valve stem disposed in the service port, and the circumferential member sealingly engages the second sealing ring 706. Using the grip 430, a force may be applied to the device 10 in the direction of the arrow 750 shown in FIG. 8. A level of force may be applied such that the exterior protrusion 725 depresses the valve stem (not shown) disposed in the service port and opens the valve. Because the circumferential member of the service port sealingly engages the second sealing ring 706, gas from the coolant system is substantially prevented from communicating with ambient. The balls 724 remain abutted against the shoulder 726, and the outer piston 720 is substantially prevented from moving axially upward within the bore 705. In this position, as shown in FIG. 8, the passage 718 may provide communication between the outer cavity 740 and the inner cavity 735, which, in turn, communicates with the outer recess 722 and the second port 120. In this manner, the coolant system may communicate with the second fluid port 120. As a result, the second port 120 experiences pressure similar to the pressure of the outer cavity 740, which, in turn, is similar to the internal pressure of the coolant system, and the measurement device 14 may measure the coolant system pressure (or other parameter in alternative embodiments).

The user may inspect the measurement device 14 and determine if additional coolant is required. In some embodiments, the measurement device 14 may indicate the need for additional coolant, for example, by displaying a measurement reading. If a need for additional coolant is determined, the user may use the servicing device 10 to charge the coolant system with more coolant from the coolant supply. It should be noted that if the coolant supply 30 is attached to the servicing device 10, coolant does not substantially communicate with the inner cavity 735, and correspondingly, the coolant system, because of the check valve 630.

When the addition of coolant is desired, the coolant supply 30 may be attached to the receiving end 410 of the servicing device 10, if not already attached. The piercing member 620 pierces the seal of the coolant supply. Because the check valve 630 is biased against its seat 631 by the spring 635, coolant still does not substantially communicate with the inner cavity 735, and correspondingly, the coolant system. Using the grip 430, an additional force may be applied to the device 10 in the direction of the arrow 750 shown in FIG. 8. A level of force may be applied such that the circumferential member of the low pressure service port acts on the second inner protrusion 716 and overcomes the biasing force of the spring 730, causing the inner piston 710 to travel upward within the bore 705. Because the inner protrusion 716 extends into the cavity 740 beyond the outer piston detent 721, the circumferential member does not initially contact the outer piston detent 721. As the inner piston 710 travels axially upward within the bore 705, the balls 724 are exposed to the inner annular recess 712. The balls 724 slide off the shoulder 726 and into the inner recess 712. At the same time, the circumferential member of the service port begins to contact the outer piston detent 721. With the balls 724 in the inner recess 712, the balls 724 may clear the shoulder 726, and the outer piston 720 and the inner piston 710 now travel upward together within the bore 705. The interior protrusion 714 may then contact and unseat the check valve 630. Coolant from the coolant supply may now flow into the inner cavity 735, through the passage 718 and into the outer cavity 740, and, finally into the coolant system. At the same time, as the outer piston 720 travels upward, the first sealing ring 702 travels past the second fluid port 120 and substantially prevents communication between the second port 120 and the inner cavity 735 such that the cavity 740, and correspondingly the coolant system, no longer communicates with the measuring device 14.

In one embodiment, pressure in the second port 120 may vent to ambient through space formed between the outer piston 720 and the bore 705. The space may be small enough such that the travel of the outer piston 720 within the bore is not adversely affected. As a result of the vented pressure, the measurement device 14 may indicate a measurement reading of substantially zero such that the user does not receive an inaccurate measurement reading during charging operation.

When coolant supply is no longer desired, the force applied to the device may be reduced. This may cause the interior protrusion 714 to move out of contact with the check valve 630 under the bias of the spring 730. The check valve 630 may return to its seat 631 and prevent communication between the coolant supply and the inner cavity 735. In this manner, the device may return to the measuring position, shown in FIG. 8. The user may apply an actuation force to the device 10 as desired to alternate between providing coolant to the coolant system and measuring a parameter of the coolant system.

Figure 9:
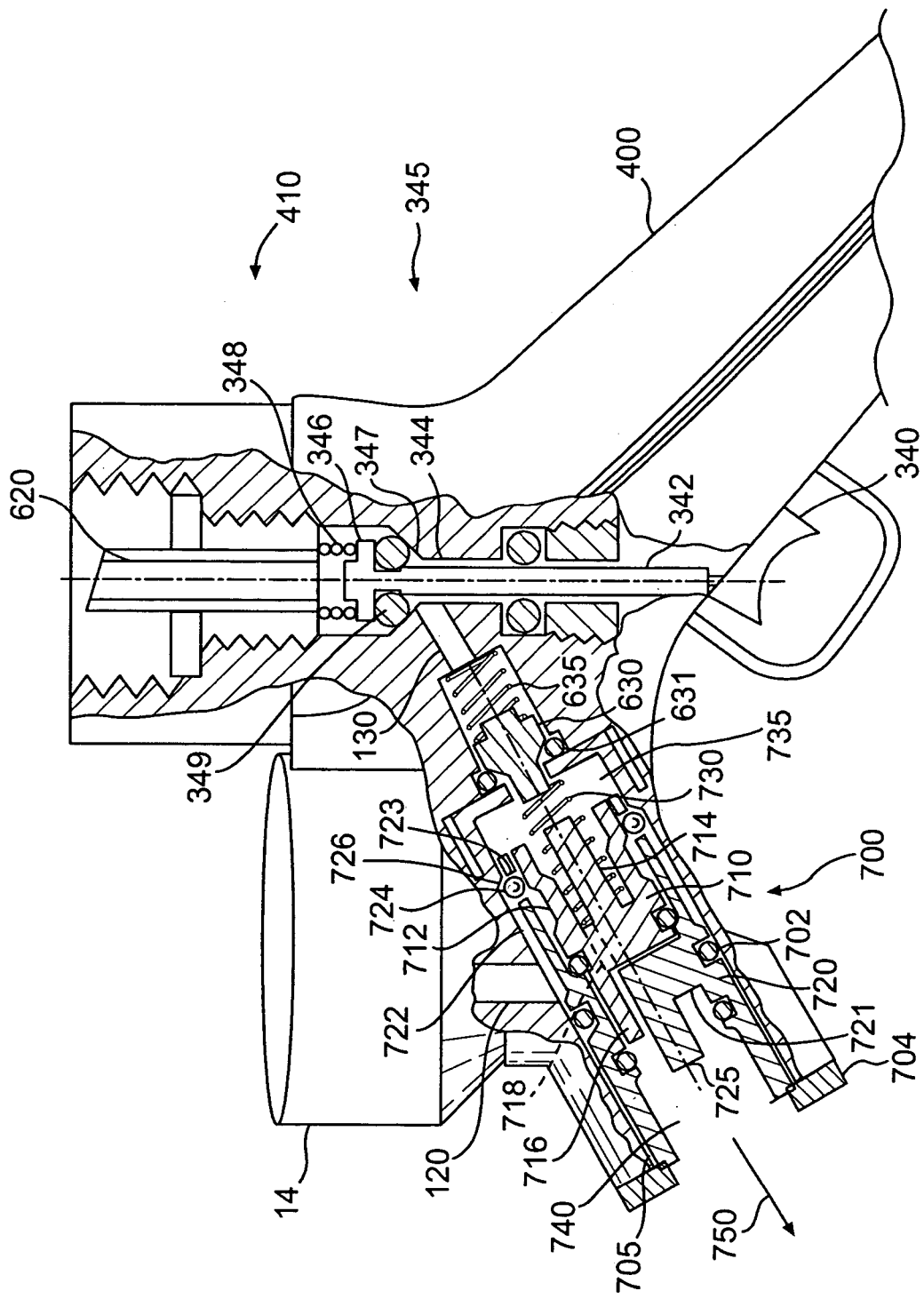
FIG. 9 is a partial cross-sectional view of a coolant system servicing device according to a fourth alternative embodiment of the present invention.

Another embodiment of the present invention is shown in FIG. 9, in which like reference numerals refer to like elements. The servicing device 10 shown in FIG. 9 is similar to that shown in FIG. 8, with the addition of a trigger 340 operatively connected to a trigger valve assembly 345. The trigger valve assembly 345 may include a trigger pin 342 slidably disposed in a second bore 344, and a trigger valve 346 disposed at one end of the trigger pin 342. The trigger pin 342 may be operatively connected to the trigger 340 at a second end. The trigger valve 346 may be biased against its seat 347 by a trigger spring 348. A sealing ring 349 may be disposed between the trigger valve 346 and the trigger valve seat 347.

The trigger valve assembly 345 may be adapted to move between a first position (shown, for example, in FIG. 9) and a second position (not shown) in which the trigger valve 346 is pushed off its seat 347 in response to an actuation force from the trigger 340. In the first position, the trigger spring 348 may bias the trigger valve 346 against its seat, substantially preventing coolant from the coolant supply source 30 from communicating to the coolant system through the third port 130. In the second position, when the trigger valve 346 is pushed off its seat 347 in response to an actuation force from the trigger 340, coolant may communicate with the third fluid port 130.

Operation of the embodiment of the present invention shown in FIG. 9 is substantially as described above with reference to FIG. 8, with an additional feature. When the addition of coolant is desired, a level of force may be applied such that the circumferential member of the low pressure service port acts on the second inner protrusion 716 and overcomes the biasing force of the spring 730, causing the inner piston 710 to travel upward within the bore 705. Because the inner protrusion 716 extends into the cavity 740 beyond the outer piston detent 721, the circumferential member does not initially contact the outer piston detent 721. As the inner piston 710 travels axially upward within the bore 705, the balls 724 are exposed to the inner annular recess 712. The balls 724 slide off the shoulder 726 and into the inner recess 712. At the same time, the circumferential member of the service port begins to contact the outer piston detent 721. With the balls 724 in the inner recess 712, the balls 724 may clear the shoulder 726, and the outer piston 720 and the inner piston 710 now travel upward together within the bore 705. The interior protrusion 714 may then contact and unseat the check valve 630. An actuation force may be applied to the trigger 340, causing the trigger pin 342 to slide upward within the bore 344, and unseating the trigger valve 346. In this position, coolant from the coolant supply may flow through the third fluid port 130 past the check valve 630 to the coolant system. In other respects, the device 10 shown in FIG. 9 operates substantially as the device shown in FIG. 8.

Figure 10:
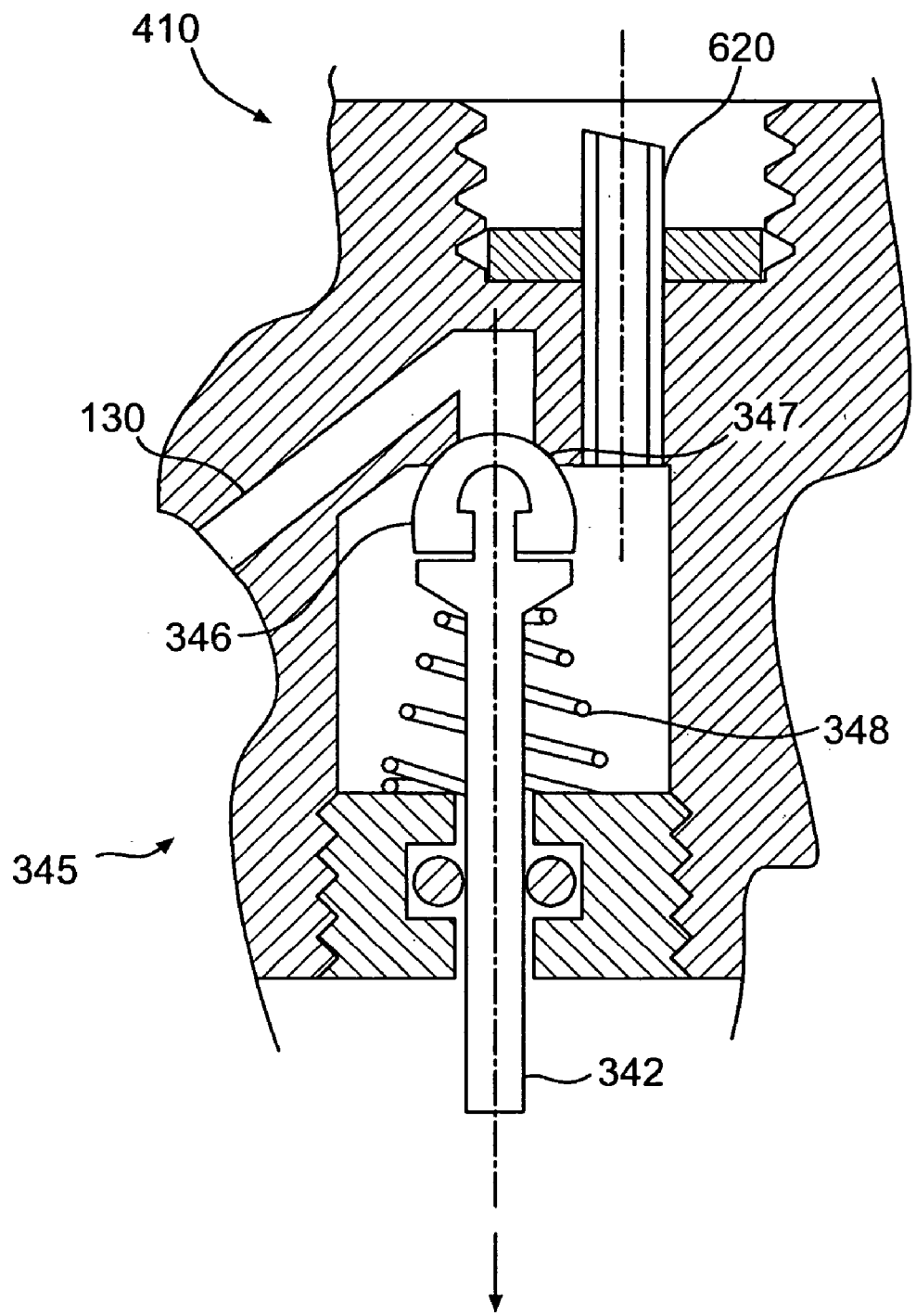
FIG. 10 is a partial cross-sectional view of an alternative trigger arrangement that may be used in accordance with the coolant system servicing device shown in FIG. 9.

In another embodiment of the present invention, shown in FIG. 10, in which like reference numerals refer to like elements, the trigger valve assembly 345 shown in FIG. 9 may be adapted to receive a pulling-force instead of a pushing force. When charging operation is desired, a pulling force may be applied to the trigger pin 342 in the direction of the arrow shown. This force may cause the trigger valve 346 to move from its seat 347. In other respects, the device 10 shown in FIG. 10 operates substantially the same as the device shown in FIG. 9.

Figure 11:
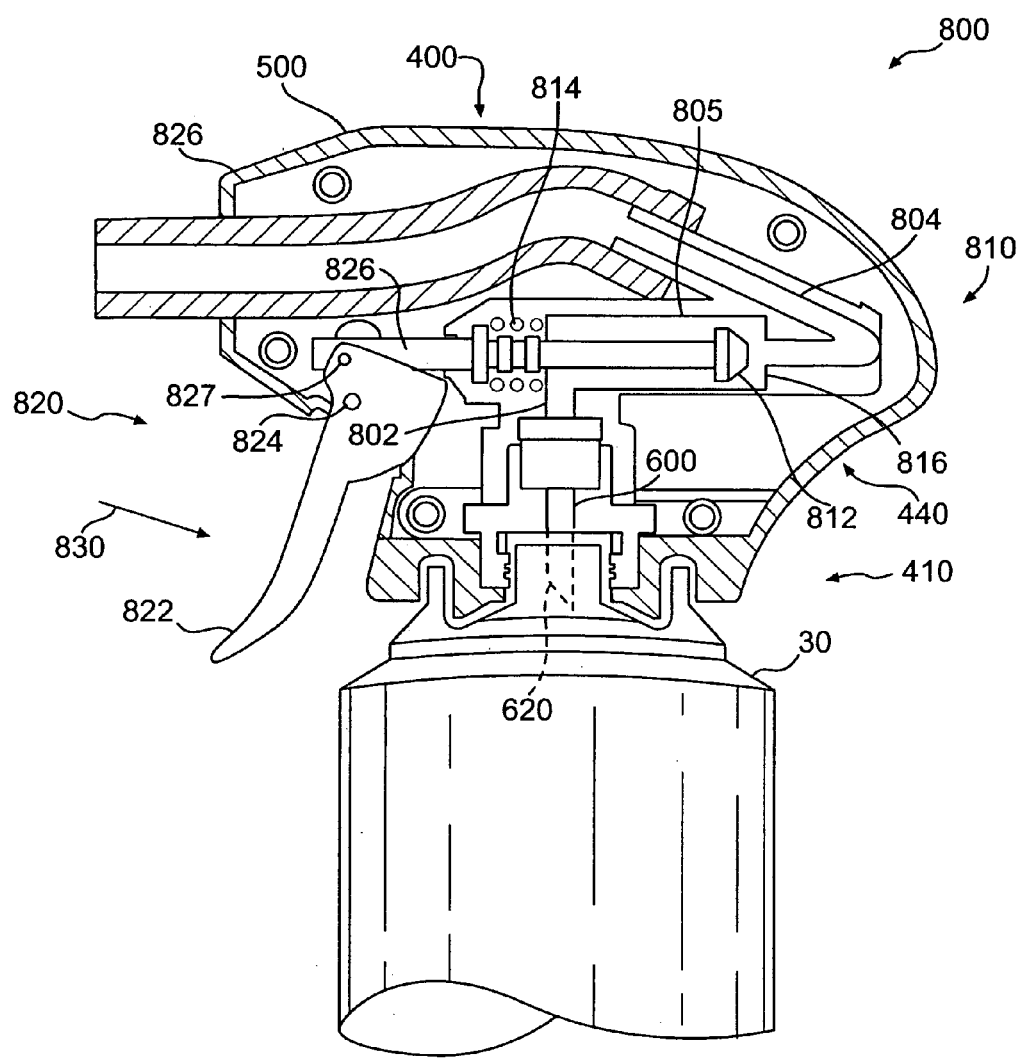
FIG. 11 is a partial cross-sectional view of a coolant system servicing device having a low packaging profile according to an embodiment of the present invention.

A coolant system servicing device 800 will now be described with reference to FIG. 11, in which like reference numerals refer to like elements in other embodiments. The servicing device 800 may include a valve 810 having a bore 805 disposed in a housing 400, and a valve actuator 820. The valve may be adapted to provide selective communication between a coolant supply passage 802 and a charging passage 804. The coolant supply passage 802 may be adapted to connect to a coolant supply container 30, and the charging passage 804 may be adapted to connect to a coolant system (not shown). The device 800 is adapted to switch between a charging mode of operation (as shown in FIG. 11), in which coolant is supplied to the coolant system, and a non-charging mode of operation, in response to actuation of the valve actuator 820.

The valve 810 may include a plunger 812 slidably disposed in the bore 805. A plunger spring 814 biases the plunger 812 against a plunger seat 816. The valve bore 805 may be in fluid communication with the coolant supply passage 802 and selective communication with the charging passage 804 depending on the position of the plunger 812.

The servicing device 800 may further comprise a valve actuator 820 for selectively applying an actuating force to the valve 810. In one embodiment, the valve actuator 820 may be adapted to receive a squeezing or gripping force. The valve actuator 820 may include a trigger 822 pivotally attached to the housing by a pin 824. Single or dual arms 826 may be attached to the trigger 822 at a first end by a pin 827 and to the plunger 812 at a second end. When the trigger 822 is squeezed in the direction of the arrow 830, the trigger 822 rotates about the pin 824. The rotation of the trigger 822 forces the arm(s) 826 leftward, overcoming the rightward bias of the plunger spring 814, and moving the plunger 812 from a non-charging position in the bore 805 to a charging position (as shown in FIG. 11). Release of the trigger 822 may allow the plunger 812 to return to its non-charging position under the influence of the spring 814.

The servicing device 800 may further comprise means 500 for connecting the device to the coolant system (not shown). The connecting means 500 may include a hose assembly 500 having a first end connected to the charging passage 804 and a second end operatively connected to the coolant system. An adapter 600 for connecting the servicing device 800 to the coolant supply container 30 may be disposed in the housing 400. The adapter 600 may include a piercing member 620 having a sharp distal end such that when the adapter engages the coolant supply container 30, the piercing member 620 pierces the seal of the container. The servicing device 800 may further comprise a receiving end 410 adapted to secure the device to the coolant supply container 30.

In one embodiment of the servicing device 800, the valve bore 805 may have a substantially horizontal orientation within the housing 400, and may be oriented substantially perpendicular to the supply passage 802. In this embodiment, the flow of coolant from the valve bore 805 is in a substantially horizontal direction toward the rear of the device, as shown in FIG. 11. The charging passage 804 may be provided with a switch-back orientation such that the flow of coolant from the valve bore 805 is directed toward the front of the device 800 where the second end of the hose assembly 500 extends from the device and is operatively connected to the coolant system. In this embodiment, the charging passage 804 may include a first portion oriented substantially parallel to the valve bore 805 and a second portion oriented substantially unparallel to the valve bore 805. In an alternative embodiment, the entire charging passage 804 may be oriented substantially parallel to the valve bore 804.

The orientation of the valve bore 805 and/or the charging passage 804 may permit a compact arrangement of the servicing device 800. In this manner, the servicing device 10 may have a small height profile. In some embodiments, the height of the housing 400 may be in the range of about 10% to about 30% of the combined height of the housing 400 and the coolant supply container 30. The proportional height of the housing 400 may vary depending on the size of the coolant supply container used. The small height profile may lead to advantages in some embodiments such as, for example, easier packaging and/or shipping of the device 10.

Operation of the servicing device 800 will now be described with reference to FIG. 11. The servicing device 800 may be connected to the coolant supply container 30 at the receiving end 410 and to an automobile coolant system by the hose assembly 500. At this time the trigger 822 may be in an extended position (not shown). Connection of the servicing device 800 to the coolant supply may cause the piercing member 620 to pierce a seal on the top of the container. As a result, pressurized coolant may pass through the piercing member 620, the adapter 600, and into the valve bore 805. While the servicing device 800 is in the non-charging position, the refrigerant may not be able to flow past the plunger 812, which is biased against its seat 816 by the spring 814. As a result, the refrigerant may not flow into the charging passage 804.

If a need for additional coolant is determined, the user may use the servicing device 800 to charge the coolant system with more coolant from the coolant supply 30. When charging operation is desired, an actuation force may be applied to the valve 810 using the trigger 822. When the trigger 822 is squeezed in the direction of the arrow 830, the trigger 822 rotates about the pin 824, causing the arm(s) 826 to move leftward against the bias of the spring 814. The leftward motion of the arm(s) 826 may in turn cause the plunger 812 to move leftward within the bore 805. In this position, as shown in FIG. 11, the plunger 812 may be moved off its seat 816, opening communication between the bore 805 and the charging passage 804. The coolant may then flow from the bore 805 and through the charging passage 804. As the coolant flows through the charging passage 804, the coolant may be redirected toward the front of the device, and may flow through the hose assembly 500 and into the coolant system. The user may apply an actuation force to the valve 810 by squeezing the trigger 822 as desired to alternate between providing coolant to the coolant system and not providing coolant.

In some embodiments, the servicing device 800 may be adapted for one-handed operation. In this manner, a user may hold the coolant supply container 30 and apply a gripping force to the trigger 822 with one hand. In some embodiments, as shown in FIG. 11, the device housing 400 may include a contoured surface 440. The contoured surface 440 may be adapted to receive the area of the user's hand between the thumb and index finger. With the user's hand in this position, the trigger 822 may be adapted to receive a gripping force from one or more of the user's fingers.

Figure 12:
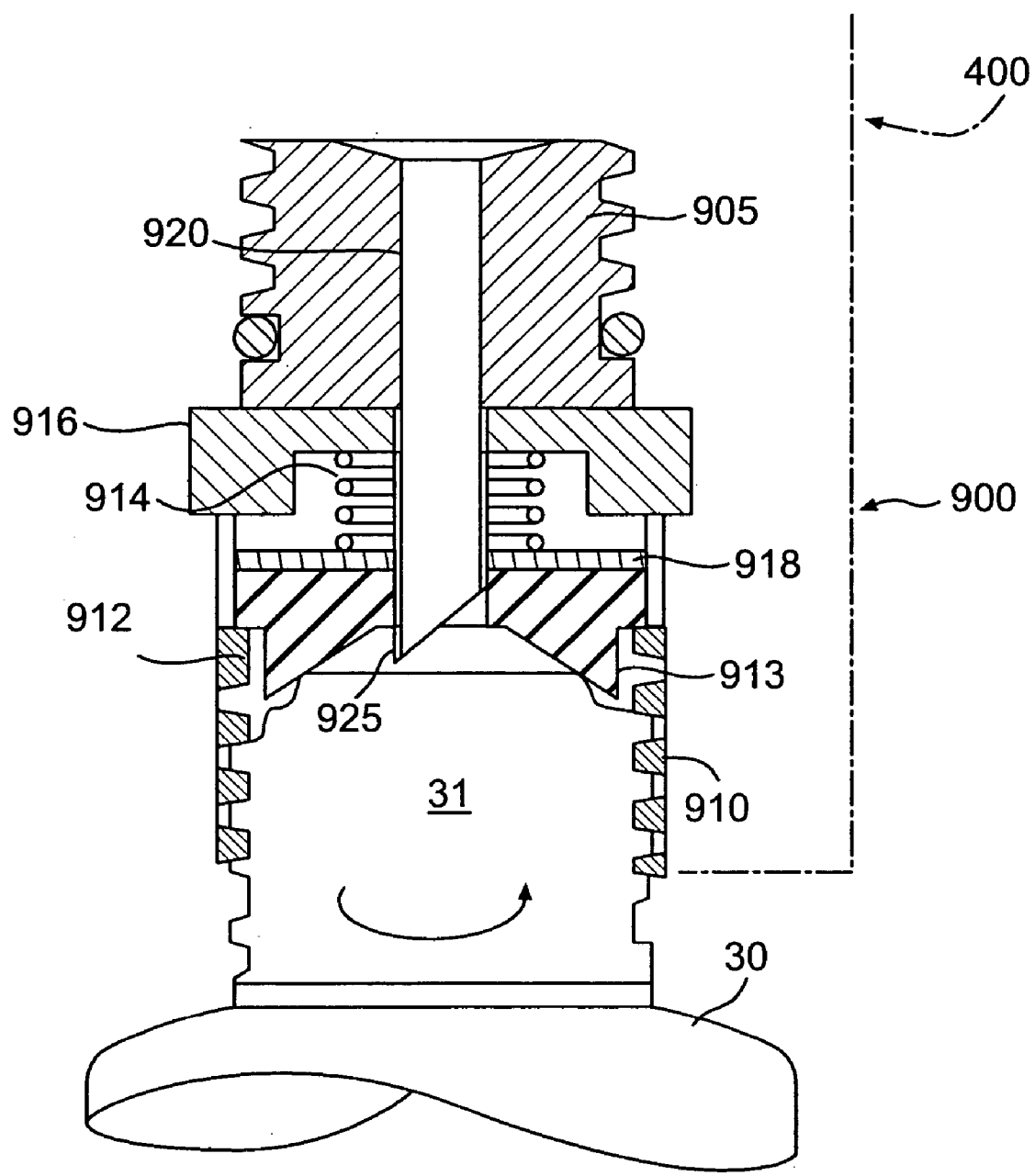
FIG. 12 is a partial cross-sectional view of an adapter for connecting a coolant system servicing device to a coolant supply in a sealing mode of operation.
Figure 13:
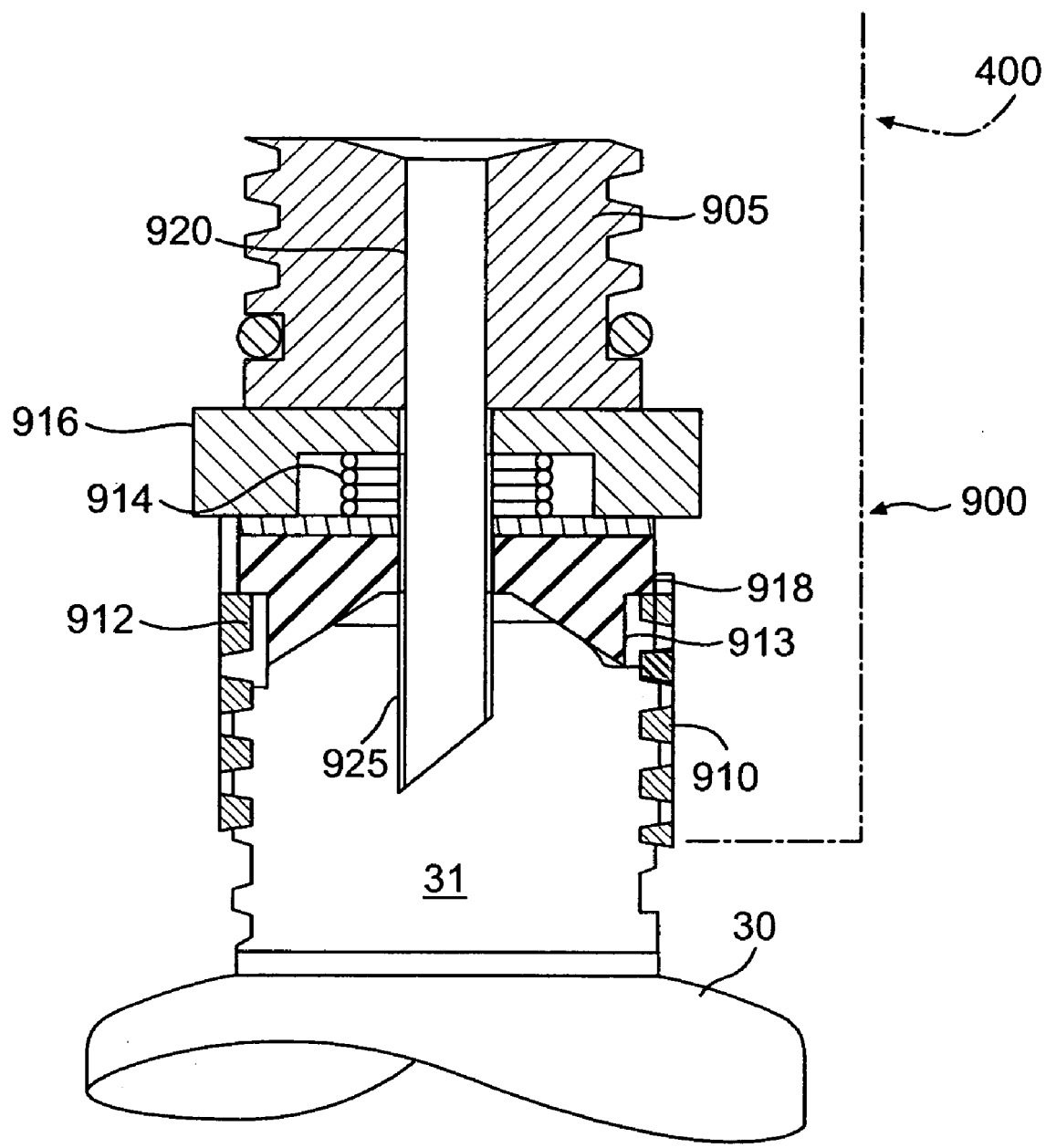
FIG. 13 is a partial cross-sectional view of the adapter shown in FIG. 12 in a piercing mode of operation.

An adapter 900 for connecting a coolant system servicing device 10 to a coolant supply container 30 will now be described with reference to FIGS. 12 and 13. The adapter 900 may be disposed in a coolant system servicing device housing 400. The adapter 900 may be used in connection with a servicing device including, but not limited to, those depicted in embodiments of the present invention. The adapter 900 may be used to connect the servicing device 10 to the coolant supply container 30 in a manner that first sealingly engages the device with the container, and then piercingly engages the device with the container. FIG. 12 illustrates the adapter 900 sealingly engaged with the coolant supply container 30, and FIG. 13 illustrates the adapter 900 piercingly engaged with the container 30.

The adapter 900 may include a connecting hub 905 for connecting the adapter to the servicing device housing 400, and a bore 910 for engaging a nozzle 31 of the coolant supply container 30. In one embodiment, the bore 910 may be threaded for engaging an Acme threaded coolant supply container 30. A user may rotate the coolant supply container 30 such that the nozzle 31 advances up the threads disposed in the bore 910. In other embodiments, the bore 910 may be adapted to engage a supply container having a quick connect fitting, and/or any other suitable container fitting.

A sealing member 912 may be slidably disposed in the bore 910. The sealing member 912 may include a shoulder 913 adapted to sealingly engage the nozzle of the coolant supply container 30. In one embodiment, the sealing member 912 may comprise a deformable material, such as, for example, rubber. Other suitable materials are considered possible and are well within the scope and spirit of the present invention. A sealing spring 914 may bias the sealing member 912 into the bore 910. The upward travel of the sealing member 912 within the bore 910 may be limited by a travel stop 916. A contact plate 918 may be disposed between the sealing member 912 and the sealing spring 914.

A piercing member 920 having a sharp distal end 925 may be disposed in the connecting hub 905. The piercing member 920 may be disposed such that, when the adapter is in the position shown in FIG. 12, the piercing member 920 does not extend into the bore 910 beyond the sealing member 912. In this manner, the coolant supply container 30 contacts the shoulder 913 of the sealing member 912 before contacting the distal end 925 of the piercing member. When the piercing member 920 engages the coolant supply container 30, the piercing member 920 pierces the seal of the container. The piercing member 920 is preferably hollow so as to allow the contents of the coolant supply container 30 to exit from the container into the servicing device 10.

Operation of the adapter 900 will now be described with reference to FIGS. 12 and 13. A servicing device 10 including the adapter 900 may be connected to an automobile coolant system at a first end (not shown). When charging of the coolant system is required, the nozzle 31 of the coolant supply container 30 may be connected to the bore 910. A user may rotate the container such that the nozzle 31 advances up the threads disposed in the bore 910. As the nozzle 31 advances upward within the bore 910, the nozzle 31 first contacts the shoulder 913 of the sealing member 912. In this position, as shown in FIG. 12, the piercing member 920 does not pierce the seal of the container 30. As the container 30 is further engaged with the bore 910, the nozzle 31 remains in contact with the sealing member 912. The nozzle 31 pushes the sealing member 912 in an upward direction within the bore 910 against the bias of the sealing spring 914. As the sealing member 912 approaches the travel stop 916, the piercing member 920 engages the coolant supply container 30, and pierces the seal of the container, as shown in FIG. 13. As a result, pressurized coolant may pass through the piercing member 620, through the servicing device 10 and into the coolant system. Because the nozzle 31 remains sealingly engaged with the sealing member 912, coolant is substantially prevented from communicating with the bore 910 and the ambient environment during operation.

It will be apparent to those skilled in the art that various other modifications and variations can be made in the construction, configuration, and/or operation of the present invention without departing from the scope or spirit of the invention. For example, it is appreciated that the present invention may include a combination of one or more of the servicing device 10, the measurement device 14, and the coolant supply source 30 provided as a complete product or kit. The depiction of the housing 400, the valve actuator 300, and the valve 200 are intended to be illustrative only, and not limiting. It is appreciated that the size and shape of the housing 400 may vary markedly without departing from the intended scope of the present invention. These and other modifications to the above-described embodiments of the invention may be made without departing from the intended scope of the invention.

What is claimed is:

1. An apparatus for servicing a coolant system adapted to receive coolant from a coolant supply, said apparatus comprising:
   a device for measuring a parameter of the coolant system;
   means for selectively switching between providing: (i) communication between the coolant system and said measuring device, and (ii) communication between the coolant system and the coolant supply and wherein said means for selectively switching substantially prevents communication between the coolant system and the measuring device when the coolant system communicates with the coolant supply.

2. The apparatus of claim 1, wherein the switching means comprises:
a three-way valve; and
a mechanical actuator operatively connected to said three-way valve.

3. The apparatus of claim 2, wherein said mechanical actuator includes a pivoting element.

4. The apparatus of claim 2, wherein said mechanical actuator includes a cam element.

5. The apparatus of claim 2, wherein said mechanical actuator is adapted to receive a squeezing force.

6. The apparatus of claim 2, wherein said valve actuator comprises: a handle; and a mechanical link connecting said handle to said valve.

7. The apparatus of claim 2, wherein said handle comprises a pistol grip.

8. The apparatus of claim 2, wherein the three-way valve comprises: a plunger slidably disposed in a central body; and a spring biasing said plunger into a first position to provide communication between the coolant system and the measuring device.

9. The apparatus of claim 2, wherein said valve comprises: an outer piston slidably disposed in a bore in the apparatus; an inner piston disposed in said outer piston; and a cavity formed in said outer piston, said cavity adapted to connect to the coolant system.

10. The apparatus of claim 9 further comprising: a check valve disposed near one end of the bore, and wherein said valve comprises: an exterior protrusion extending from said outer piston and adapted to contact the coolant system; and an interior protrusion extending from said inner piston and adapted to engage a check valve provided in the apparatus.

11. The apparatus of claim 1, wherein said measuring device comprises a pressure gauge.

12. The apparatus of claim 1, wherein the coolant system comprises an automobile air conditioner.

13. The apparatus of claim 1, wherein the coolant supply comprises a pressurized container of at least refrigerant.

14. A device for servicing a coolant system, said device comprising:
an outer housing;
a central body disposed within the outer housing, said central body having an internal bore and first, second, and third fluid ports communicating with said internal bore;
the first fluid port configured for fluid communication with a coolant system, the second fluid port in fluid communication with a measuring device, and the third fluid port configured for fluid communication with a coolant supply;
a valve disposed in said internal bore, said valve adapted to attain a first position in which there is communication between said first fluid port and said second fluid port, and a second position in which there is communication between said first fluid port and said third fluid port;
a valve actuator operatively connected to said valve and wherein
the valve substantially prevents communication between the coolant system and the measuring device when the coolant system communicates with the coolant supply.

15. The device of claim 14, wherein said valve comprises: a plunger slidably disposed in the internal bore; and a spring biasing said plunger into a first position.

16. The device of claim 15, wherein said plunger provides substantially exclusive communication between said first and second fluid ports when the valve is in the first position.

17. The device of claim 16, wherein said plunger provides substantially exclusive communication between said first and third fluid ports when the valve is in the second position.

18. The device of claim 14, further comprising a coolant container connection adapter, said adapter being connected to the central body via a fluid passage.

19. The device of claim 18, wherein the adapter comprises a piercing member.

20. The device of claim 18, further comprising a check valve disposed between the central body and the adapter.

21. The device of claim 14, wherein said valve actuator comprises: a handle; and a mechanical link connecting said handle to said valve.

22. The device of claim 21, wherein said handle comprises: a blade having a cam edge; and a cam surface on said mechanical link for receiving the cam edge of said blade.

23. The device of claim 22, wherein said mechanical link comprises one or more arms pivotally attached to the valve.

24. A system for servicing an automobile air conditioner, said system comprising:
a coolant supply source;
means for measuring a parameter of the coolant in the automobile air conditioner; and
a device for servicing the automobile air conditioner, said device comprising:
a central body;
a valve disposed in said central body; and
a valve actuator, wherein said valve is adapted to provide selective communication between the automobile air conditioner and (i) said measuring means, and (ii) said coolant supply source, responsive to an actuation force from said valve actuator; and wherein
said valve substantially prevents communication between the automobile air conditioner and the measuring means when the automobile air conditioner communicates with the coolant supply source.

25. The system of claim 24, wherein said measuring means comprises a pressure gauge.

26. The system of claim 25, wherein said coolant supply source comprises a pressurized container of a refrigerant.

27. The system of claim 24, wherein said valve comprises: a plunger slidably disposed in a bore formed in said central body between a first position and a second position; and a spring biasing said plunger in the first position.

28. The system of claim 27, wherein when said plunger is in the first position, said measuring means measures a parameter of the automobile air conditioner, and when said plunger is in said second position, at least a portion of the coolant is released from the coolant supply source into the automobile air conditioner.

29. The system of claim 24, wherein said valve actuator comprises: a handle; and a mechanical link connecting said handle to said valve.

30. The system of claim 29, wherein said handle comprises: a blade having a cam edge; and a cam surface on said mechanical link for receiving the cam edge of said blade.

31. A method of servicing a coolant system using a servicing apparatus attached to a measuring device and a coolant supply, said method comprising the steps of:
attaching the servicing apparatus to the coolant system; and selectively switching between providing: (i) communication between the coolant system and the measuring device, and (ii) communication between the coolant system and the coolant supply; and further comprising the step of substantially preventing communication between the coolant system and the measuring device when the coolant system communicates with the coolant supply.

32. The method of claim 31, wherein the step of selectively switching comprises the step of: providing an actuating force to the servicing apparatus for switching between measuring a coolant system parameter and providing coolant to the coolant system.

33. The method of claim 32, wherein the step of providing an actuating force comprises the step of squeezing a handle of the servicing apparatus.

34. The method of claim 32, wherein the step of providing an actuating force comprises the step of contacting an exterior protrusion of the servicing apparatus against a service port of the coolant system using a first level of force to provide communication between the coolant system and the measuring device and a second level of force to provide communication between the coolant system and the coolant supply.

35. The method of claim 31, further comprising the step of substantially preventing communication between the coolant system and the coolant supply when the measuring device communicates with the coolant supply.

36. The method of claim 35, further comprising the step of venting pressure from the measuring device when the coolant system communicates with the coolant supply.

37. The method of claim 35, further comprising the step of displaying a zero measurement on the measuring device when the coolant system communicates with the coolant supply.

38. A method of servicing a coolant system using a servicing apparatus attached to a measuring device and a coolant supply, said method comprising the steps of: attaching the servicing apparatus to the coolant system; and selectively providing a squeezing force to the servicing apparatus for switching between measuring a coolant system parameter and providing coolant to the coolant system.

* * * * *